United States Patent [19]
Suzuki et al.

[11] Patent Number: 5,644,410
[45] Date of Patent: Jul. 1, 1997

[54] IMAGE SENSING APPARATUS

[75] Inventors: Masao Suzuki, Tokyo; Kazuyuki Matoba, Fukuoka; Norihiro Nanba, Kawasaki, all of Japan

[73] Assignee: Canon Kabushiki Kaisha, Tokyo

[21] Appl. No.: 440,116

[22] Filed: May 12, 1995

Related U.S. Application Data

[63] Continuation of Ser. No. 213,975, Mar. 16, 1994, abandoned.

[30] Foreign Application Priority Data

Mar. 19, 1993 [JP] Japan .................... 5-085575

[51] Int. Cl.$^6$ .................... H04N 1/40; G06K 9/38
[52] U.S. Cl. .................... 358/471; 358/473; 382/312; 382/313
[58] Field of Search .................... 358/473, 472, 358/474, 482, 483, 471; 250/208.1; 382/312, 313

[56] References Cited

U.S. PATENT DOCUMENTS

| | | | |
|---|---|---|---|
| 4,901,164 | 2/1990 | Kurosawa | 358/473 |
| 5,295,485 | 3/1994 | Shinomura et al. | 128/660.07 |
| 5,359,644 | 10/1994 | Tanaka et al. | 379/96 |
| 5,392,054 | 2/1995 | Bottomley et al. | 343/702 |

FOREIGN PATENT DOCUMENTS

| 0183980 | 6/1986 | European Pat. Off. | 358/473 |
|---|---|---|---|
| 2210951 | 10/1990 | Japan | 358/473 |

*Primary Examiner*—Edward L. Coles, Sr.
*Assistant Examiner*—Madeleine Av Nguyen
*Attorney, Agent, or Firm*—Morgan & Finnegan, L.L.P.

[57] ABSTRACT

Provided is an image sensing apparatus in which it is possible to use an optical system having a large aperture and an image sensing system such as an image sensing element in an image sensing cartridge docked with a portable image device. The image sensing apparatus includes a portable information device and an image sensing cartridge, which has at least an image sensing system, capable of being loaded in and unloaded from the information device. An image sensing operation becomes possible by docking the information device and the image sensing cartridge. The image sensing cartridge has an opening, which is for introducing light to the image sensing system, the aperture of which is designed to be larger than the shortest portion of an insertion port, which is provided in the information device, for inserting the image sensing cartridge.

54 Claims, 39 Drawing Sheets

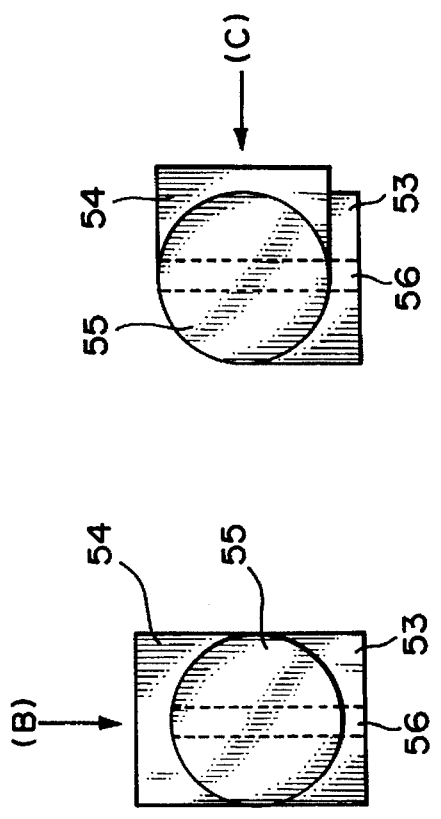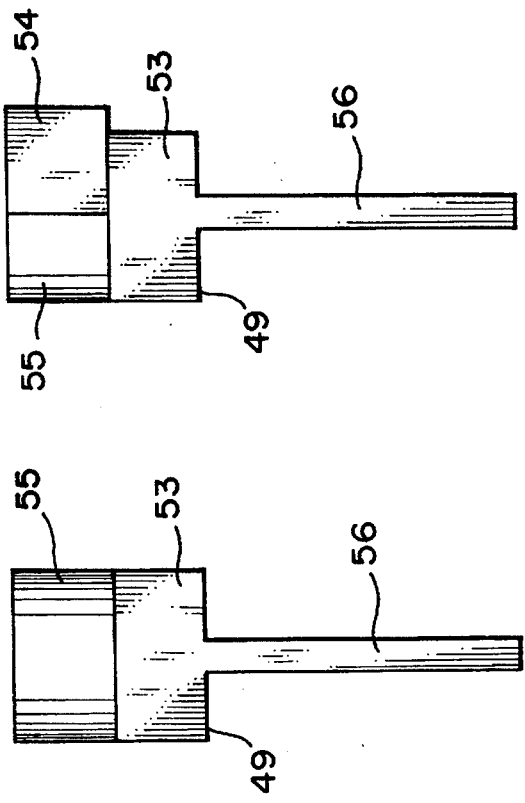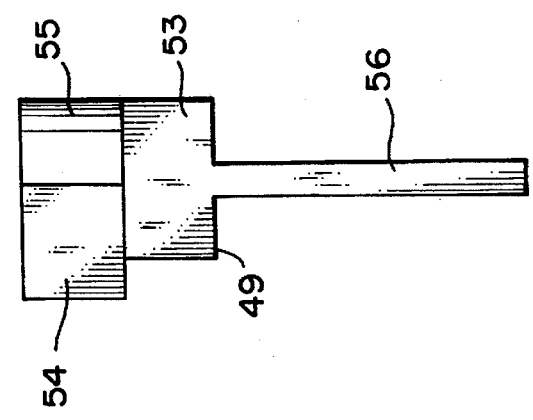

ns apparatus # IMAGE SENSING APPARATUS

This is a continuation of application Ser. No. 08/213,975, filed on Mar. 16, 1994, abandoned.

BACKGROUND OF THE INVENTION

This invention relates to an image sensing apparatus comprising a portable information device and an image sensing cartridge connected thereto.

Recent reductions in the size of portable personal computers, the combination of such portable personal computers with a communication function and improvements in the capabilities of electronic notebooks have made possible the use of portable, compact information devices of the kind illustrated in FIG. 1. At the same time, arranging it so that image information can be handled is deemed to be the most important factor as far as such portable information devices is concerned.

Various methods have been proposed for incorporating an image sensing function in such a portable information device to allow the sensing and entry of characters, images and the like so that the device may be provided with a function equivalent to that of a facsimile machine or camera. However, it is difficult to imagine that all portable information devices will require the above-described image sensing unit. In addition, if one portable information device is provided with only one identical image sensing unit, it will be very difficult for the device to accommodate the trend toward multiple functions in which the device can be used as both a camera and as a facsimile machine.

Accordingly, consideration has been given to using a card-type image sensing cartridge, of the kind shown in FIGS. 2 and 3, that is coupled to the portable information device via a card interface. In this case, image sensing cartridges may be interchanged so that an image sensing apparatus comprising the portable information device and the image sensing cartridge can be used in a variety of applications.

FIG. 1 is a perspective view of a portable information device, FIG. 2 a perspective view of an image sensing cartridge, FIG. 3 a view showing the internal construction of the cartridge, FIG. 4 a perspective view showing the portable information device and the image sensing cartridge after they are docked, and FIG. 5 an electrical block diagram of the image sensing cartridge.

As shown in FIG. 1, numeral 8 denotes the portable information device, 9 an antenna for wireless communication, 10 an insertion port for inserting an image sensing cartridge, and 17 a display unit for displaying various information. In FIG. 2, numeral 62 denotes an image sensing cartridge having an opening 2 that allows entry of reflected light from a subject. In FIG. 3, numeral 3 denotes an optical system such an image pick-up lens or the like, 4 an image sensing element, 5 a substrate on which a drive IC or the like for driving the image sensing element 4 is mounted, 6 a DC-DC converter for generating the voltage needed to drive the image sensing element 4, and 7 a substrate on which a signal processing circuit for obtaining a prescribed signal from the output of the image sensing element 4 is mounted.

Shown in FIG. 5 are the image sensing element 4, such as a CCD, a preprocessor 33 for subjecting the output of the image sensing element 4 to CDS processing or the like, an A/D converter 34, a compressing processor 35 for reducing redundancy of digital image signal information, a memory 36, interface processing circuits (I/F) 37 and 42, a clock circuit 38 for generating a timing signal that drives the image sensing element 4, a drive circuit 39 for amplifying the timing signal so as to enable driving of the image sensing element 4, a DC-DC converter 40 for generating enough voltage from a prescribed voltage value to drive the image sensing element 4, and a central processing unit (CPU) 41 for controlling the ICs of the A/D converter 34, the memory 36 and the clock circuit 38, etc., as well as the optical system 3. Numeral 43 denotes a connector for interconnecting the image sensing cartridge 62 and the portable information device 8.

In the above-described arrangement, an image sensing command is transmitted from the portable information device 8 via the connector 43, whereupon the command enters the CPU 41 through the I/F 42. In response to this command, the CPU 41 introduces electric power to each of the signal processors and commands the clock 38 to output the timing signal for the image sensing element.

The timing signal outputted by the clock circuit 38 is converted into a signal, which is capable of driving the image sensing element 4, in the drive circuit 39 by the output obtained from the voltage conversion performed by the DC-DC converter 40. By virtue of the drive signal thus obtained, the image of the subject exposed by the image sensing element 4 is converted into an electrical signal, which is then sent to the preprocessor 33. The latter executes processing such as CDS processing and non-linearizing processing, which must be carried out before the output of the image sensing element 4 is subjected to an A/D conversion.

The output of the preprocessor 33 enters the A/D converter 34, where it is converted into a digital signal. The digital signal is then subjected to information compression, which is suited to the image sensing element 4, by the compressing processor 35. The compressed signal is held temporarily in the memory 36 before being sent to the recording medium of the portable information device via the I/F 37 and connector 43. The signal is thus recorded on the recording medium.

The image information sensed by the image sensing cartridge 62 and recorded in the portable information device 8 by the above-described processing is reproduced or edited in the portable information device 8 or used in communication.

In order to realize the image sensing cartridge 62 described above, it is necessary that the opening 2 of the image sensing cartridge 62 be situated inside the insertion port 10 of the portable information device 8, as shown in FIG. 4. This means that the aperture (a in FIG. 2) of the opening 2 must be made smaller than the length (b in FIG. 1) of the short side of the cross section possessed by the insertion port 10. Consequently, as evident from FIG. 3, it is required that the optical system 3 and image sensing element 4 within the image sensing cartridge 62 have fairly small apertures.

However, in a case where the aperture of the optical system 3 is made very small, problems are encountered in terms of lens capability (especially in terms of a decline in resolution and an increase in loss of absolute light quantity). Manufacture also becomes more complicated. Furthermore, it is difficult to assure brightness in a multiple focal-point lens such as a zoom lens. In addition, in order to obtain an ultra-small image sensing element 4, there is an increase in pixel density and an attendant decline in sensitivity.

SUMMARY OF THE INVENTION

An object of the present invention is to provide an image sensing apparatus in which it is possible to use an optical system having a large aperture and an image sensing system such as an image sensing element in an image sensing cartridge docked with a portable image device.

According to the present invention, the foregoing object is attained by providing an image sensing apparatus comprising a portable information device and an image sensing cartridge, which has at least an image sensing system, capable of being loaded in and unloaded from the information device, wherein an image sensing operation becomes possible by docking the information device and the image sensing cartridge, characterized in that the image sensing cartridge has an opening, which is for introducing light to the image sensing system, the diameter of which is designed to be larger than the shortest side of an upper surface, which is provided in the information device, for inserting the image sensing cartridge.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 37A to 37C are external views of an image sensing cartridge in a modification of the tenth embodiment;

DESCRIPTION OF THE PREFERRED EMBODIMENTS

Figure 1:
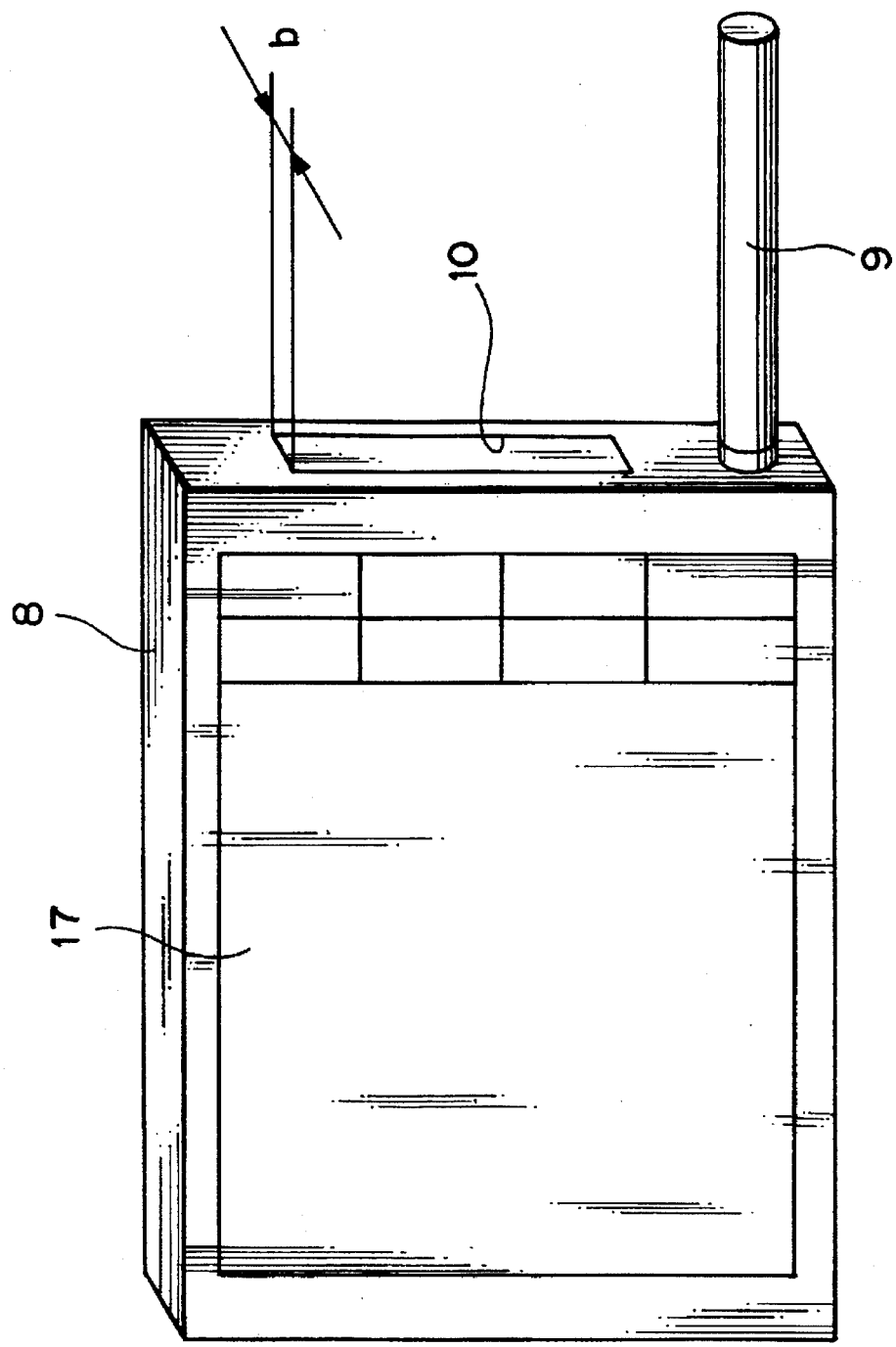
FIG. 1 is a perspective view of a portable information device according to the prior art.
Figure 2:
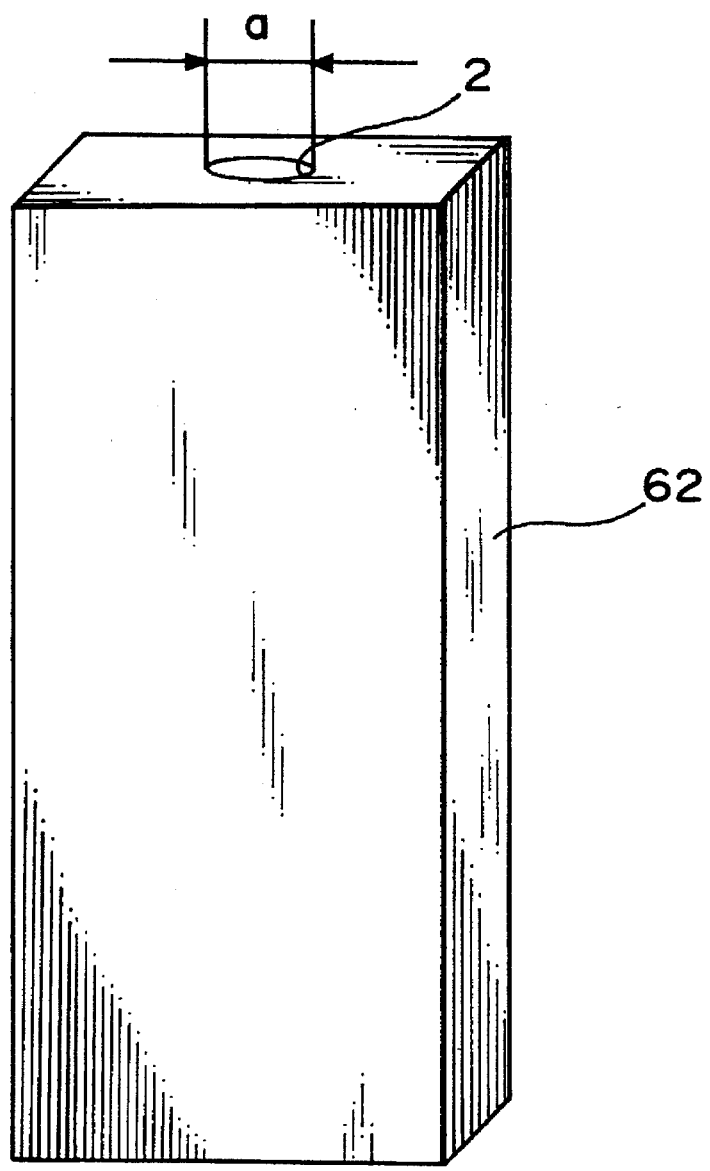
FIG. 2 is a perspective view of an image sensing cartridge according to the prior art.
Figure 3:
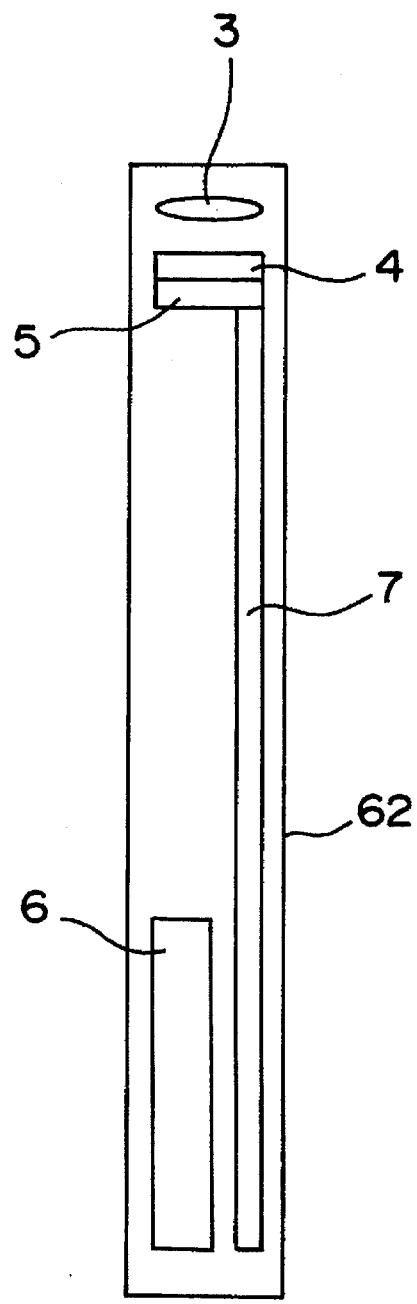
FIG. 3 is a view showing the internal construction of the image sensing cartridge according to the prior art.
Figure 4:
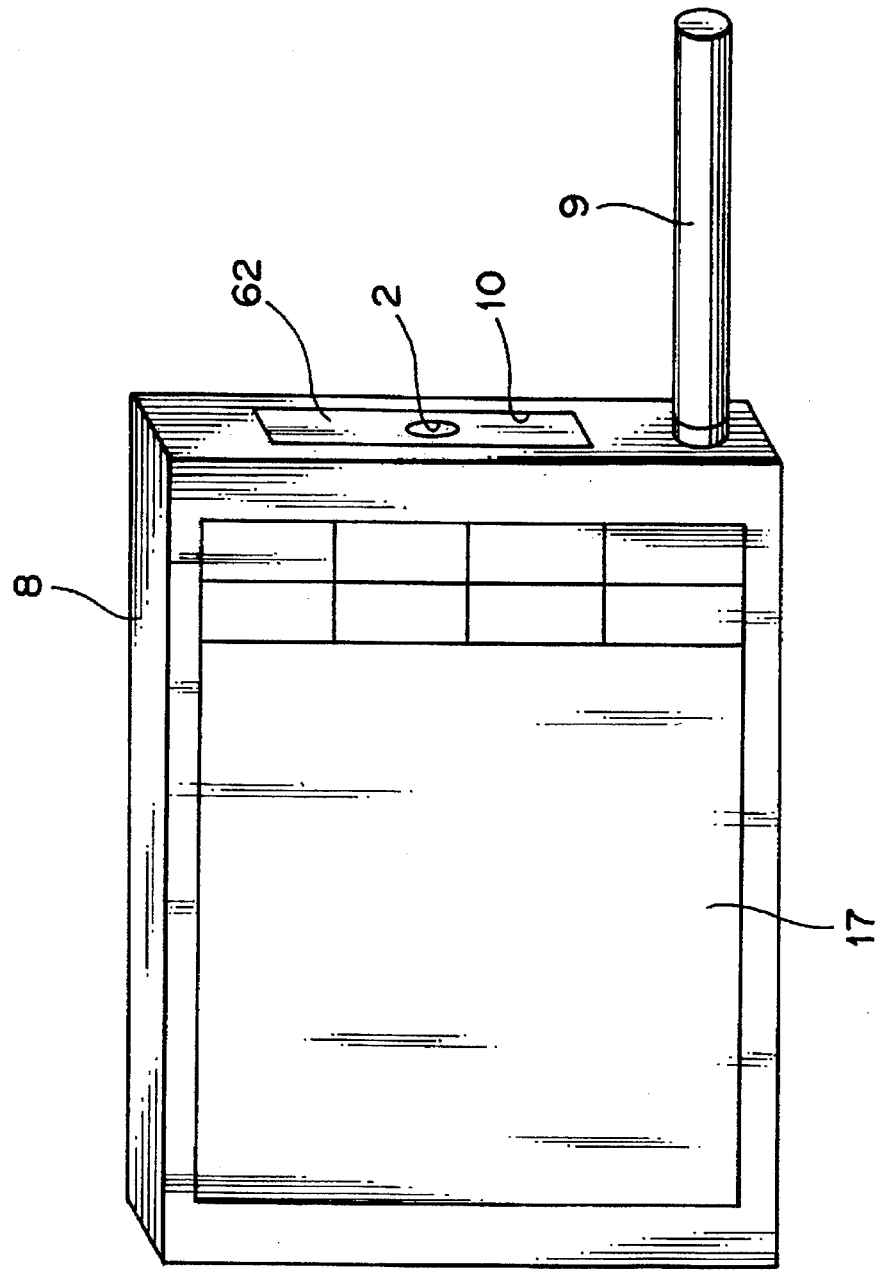
FIG. 4 is a perspective view showing the conventional portable information device and image sensing cartridge after they are docked.
Figure 5:
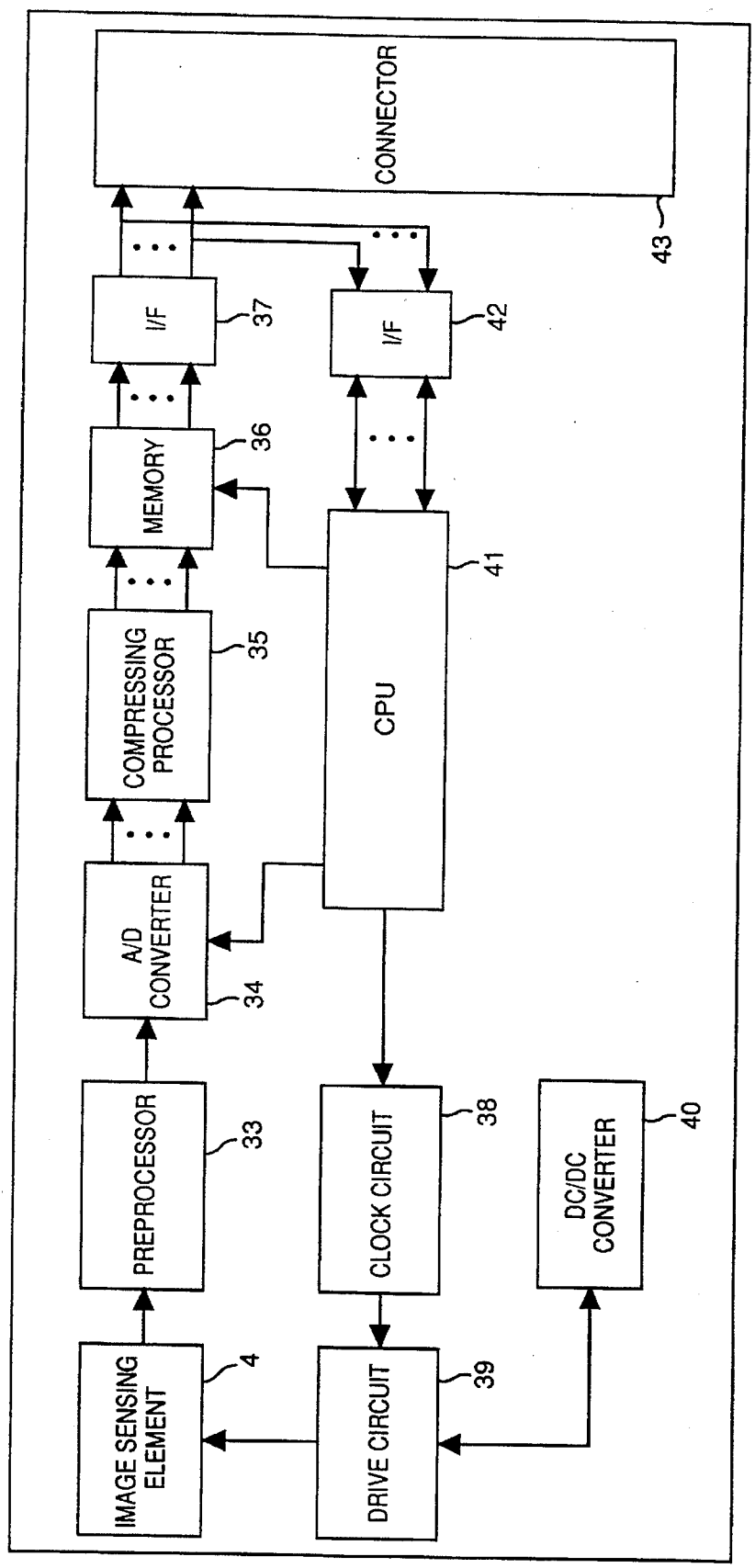
FIG. 5 an electrical block diagram of the image sensing cartridge according to the prior art.

Embodiments of the invention will now be described with reference to FIGS. 6–39. Substantially identical components in these embodiments are designated by like reference characters and are not described redundantly. Further, the electrical block diagram of the image sensing cartridge in these embodiments is basically the same as that of the prior art illustrated in FIG. 5.

(First Embodiment)

Figure 6:
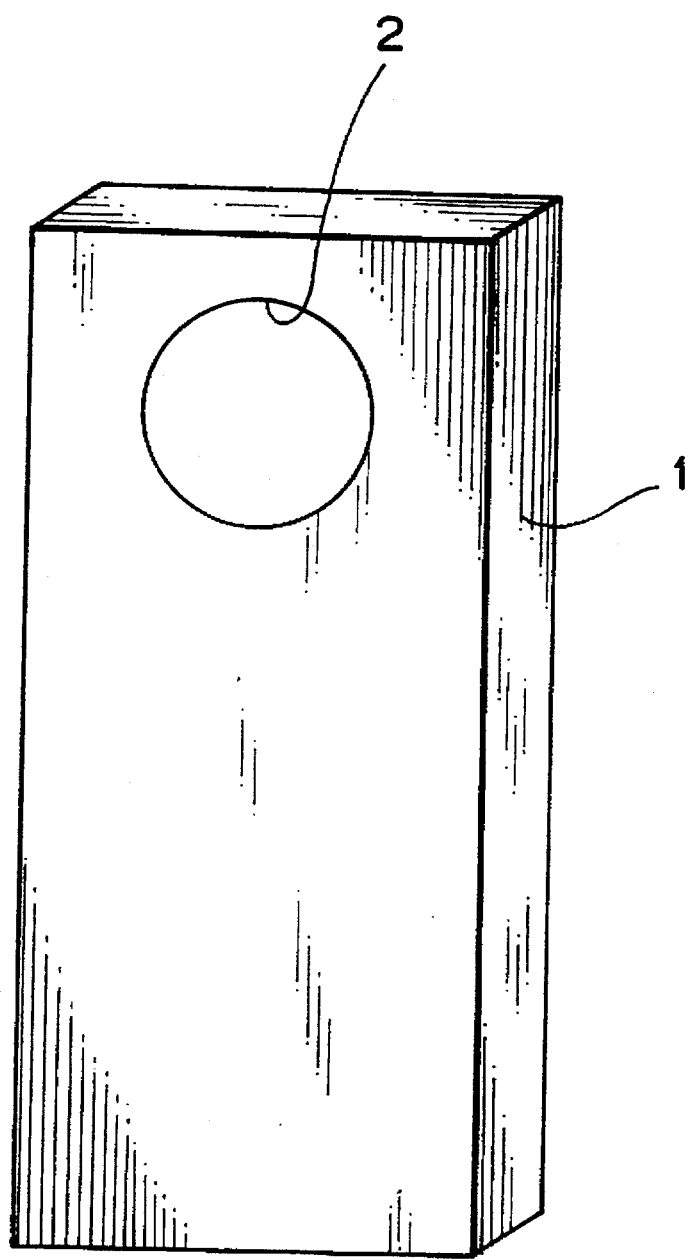
FIG. 6 is a perspective view of an image sensing cartridge according to a first embodiment of the present invention.
Figure 7:
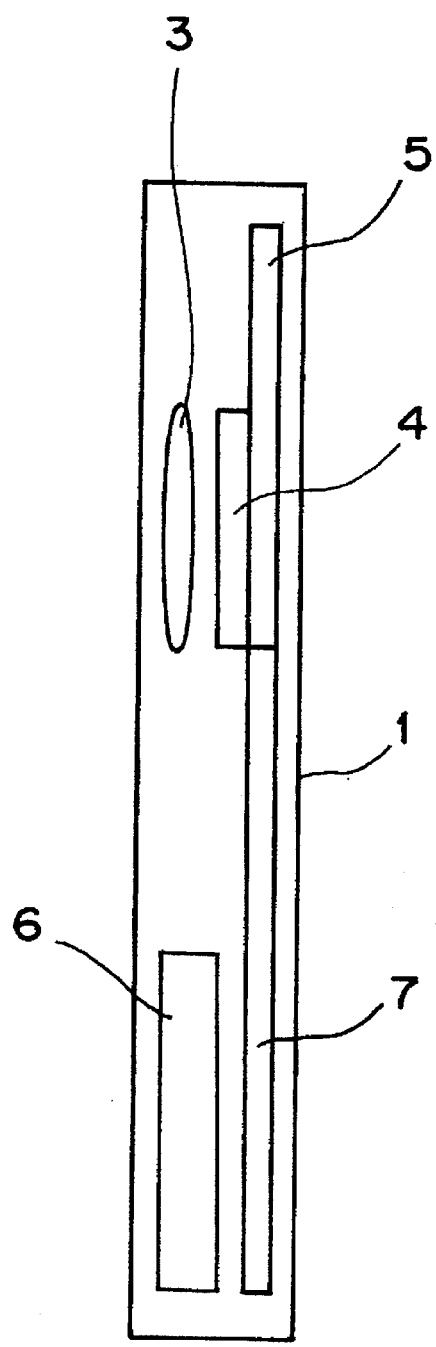
FIG. 7 is a view showing the internal construction of the image sensing cartridge according to the first embodiment.
Figure 8:
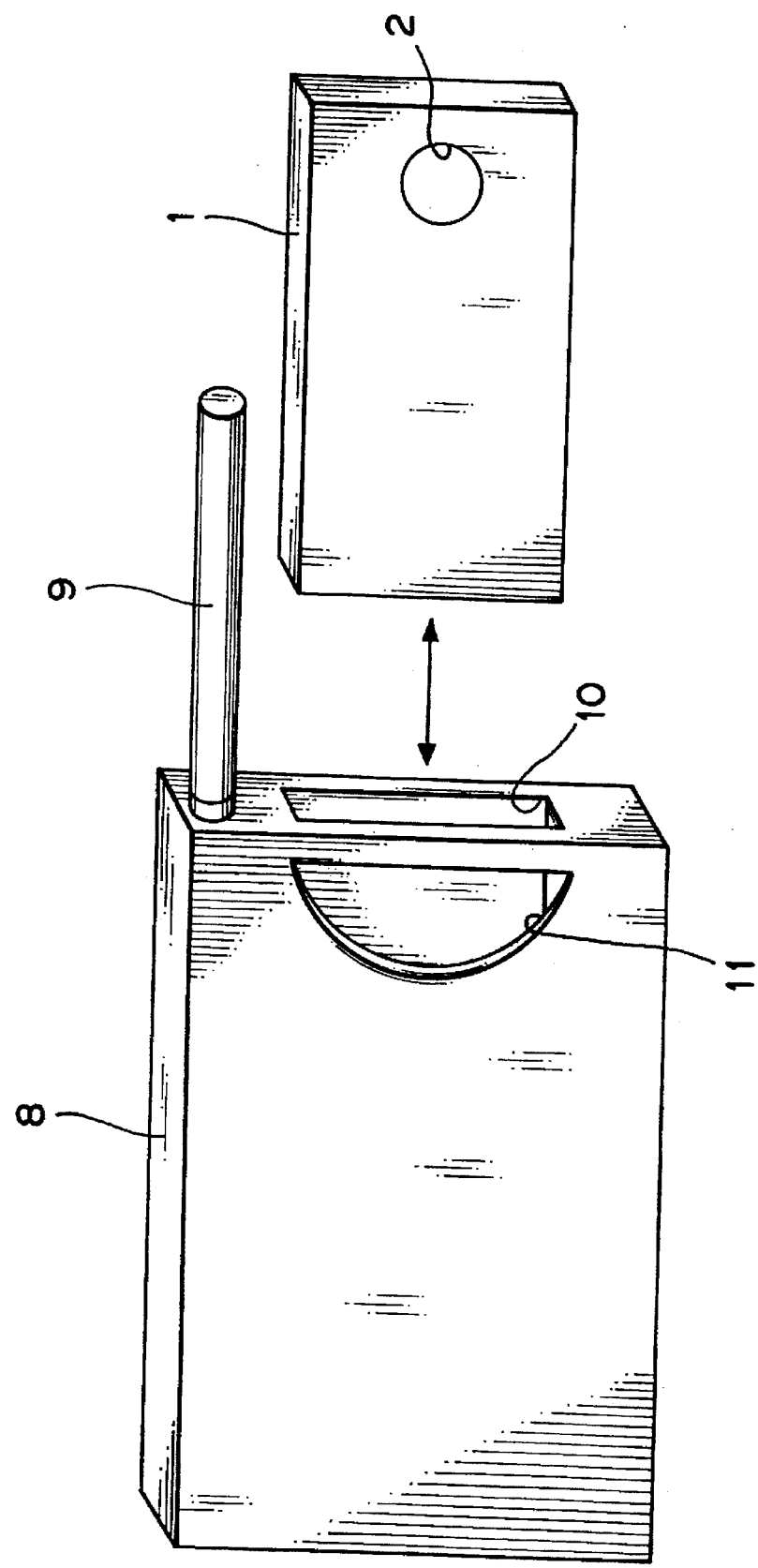
FIG. 8 is a perspective view showing the portable information device and image sensing cartridge of the first embodiment before they are docked.
Figure 9:
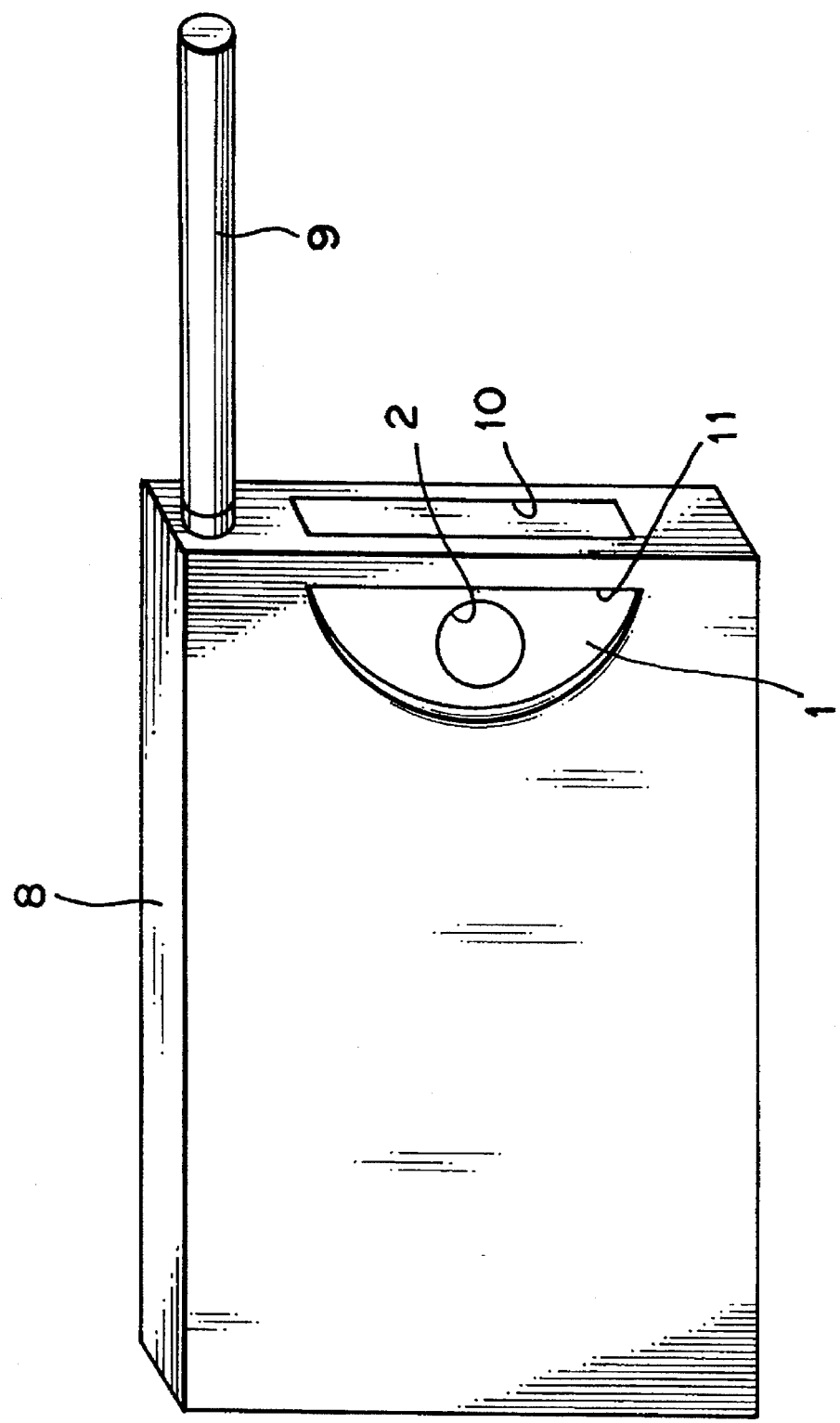
FIG. 9 is a perspective view showing the portable information device and image sensing cartridge of the first embodiment after they are docked.

FIGS. 6–9 are diagrams for describing a first embodiment of the invention, in which FIG. 6 is a perspective view of an image sensing cartridge, FIG. 7 is a view showing the internal construction of the image sensing cartridge, FIG. 8 is a perspective view showing the portable information device and image sensing cartridge before they are docked, and FIG. 9 is a perspective view showing the portable information device and image sensing cartridge after they are docked.

In FIG. 6, numeral 1 denotes an image sensing cartridge having an opening 2 for introducing the light from a subject to an optical system. As shown in FIG. 7, an optical system 3 controls the focal point and brightness of reflected light from the subject. Numeral 4 denotes a light sensing element, 5 a substrate mounting a clock IC (the clock circuit 38 of FIG. 5) and a drive IC (the drive circuit 39 of FIG. 5) that are for driving the image sensing element 4, 6 a DC-DC converter (the DC-DC converter 40 of FIG. 5), and 7 a substrate (mounting the preprocessor 33, A/D converter 34, compressing processor 35, memory 36, I/Fs 37 and 42 and CPU 41, etc., of FIG. 5) for executing processing in such a manner that the output of the image sensing element 4 can be handled by the portable information device.

In FIG. 8, numeral 8 denotes the portable information device, 9 an antenna for wireless communication, 10 an insertion port for inserting the image sensing cartridge 1, and 11 an opening for exposing the opening 2 of the image sensing cartridge 1.

As shown in FIG. 6, the opening 2 of the image sensing cartridge 1 is formed in the side face of the cartridge and has a large diameter. The opening 11 of the portable information device 8 is formed in the corresponding side face of the device and is sized so as expose the opening 2 of the image sensing cartridge 1.

FIG. 9 illustrates the above-described image sensing cartridge 1 and the portable information device 8 when they are docked. Specifically, the image sensing cartridge 1 is completely inserted into the insertion port 10 of the portable information device 8 but the cartridge is so constructed that the opening 2 of the image sensing cartridge falls within the opening 11 of the portable information device 8. As a result, the image sensing cartridge 1 and portable information device 8 can be docked without blocking the opening 2 of the image sensing cartridge 1. This makes it possible to make the diameter of the opening 2 of the image sensing cartridge 1 sufficiently larger than the length of the shortest side of the insertion port 10 in the portable information device.8. Accordingly, as shown in FIG. 7, an optical system 3 and an image sensing element 4 of large diameters can be used in the image sensing cartridge 1.

(Second Embodiment)

Figure 10:
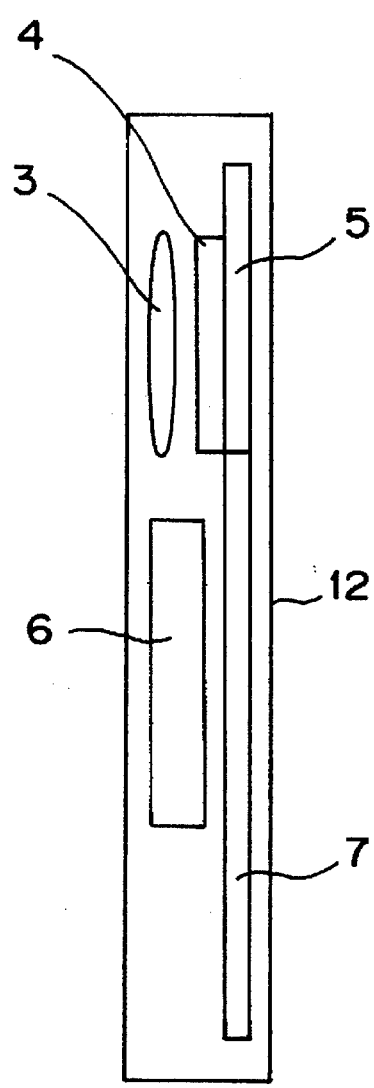
FIG. 10 is a view showing the internal construction of the image sensing cartridge according to a second embodiment.
Figure 11:
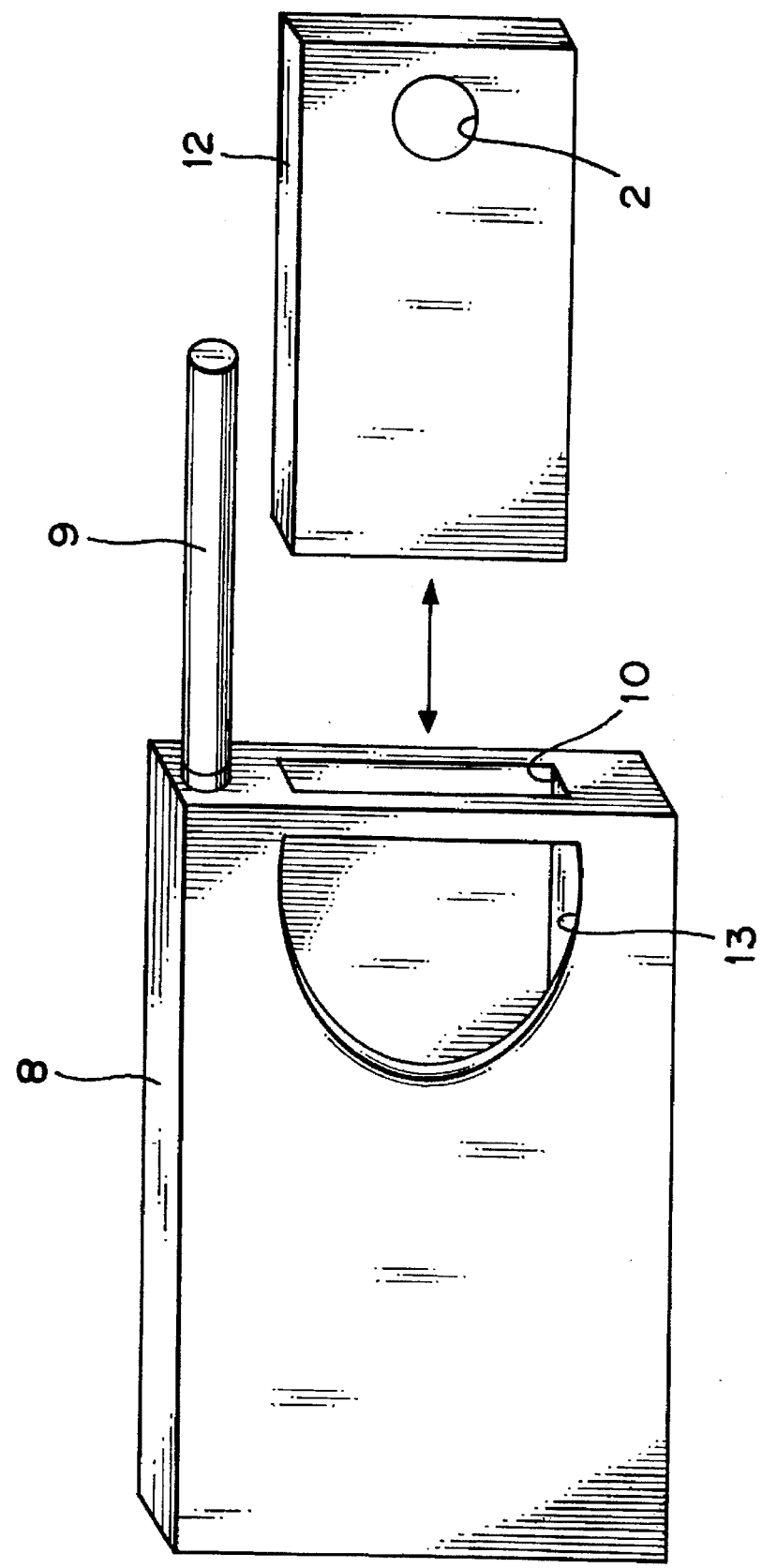
FIG. 11 is a perspective view showing the portable information device and image sensing cartridge of the second embodiment before they are docked.
Figure 12:
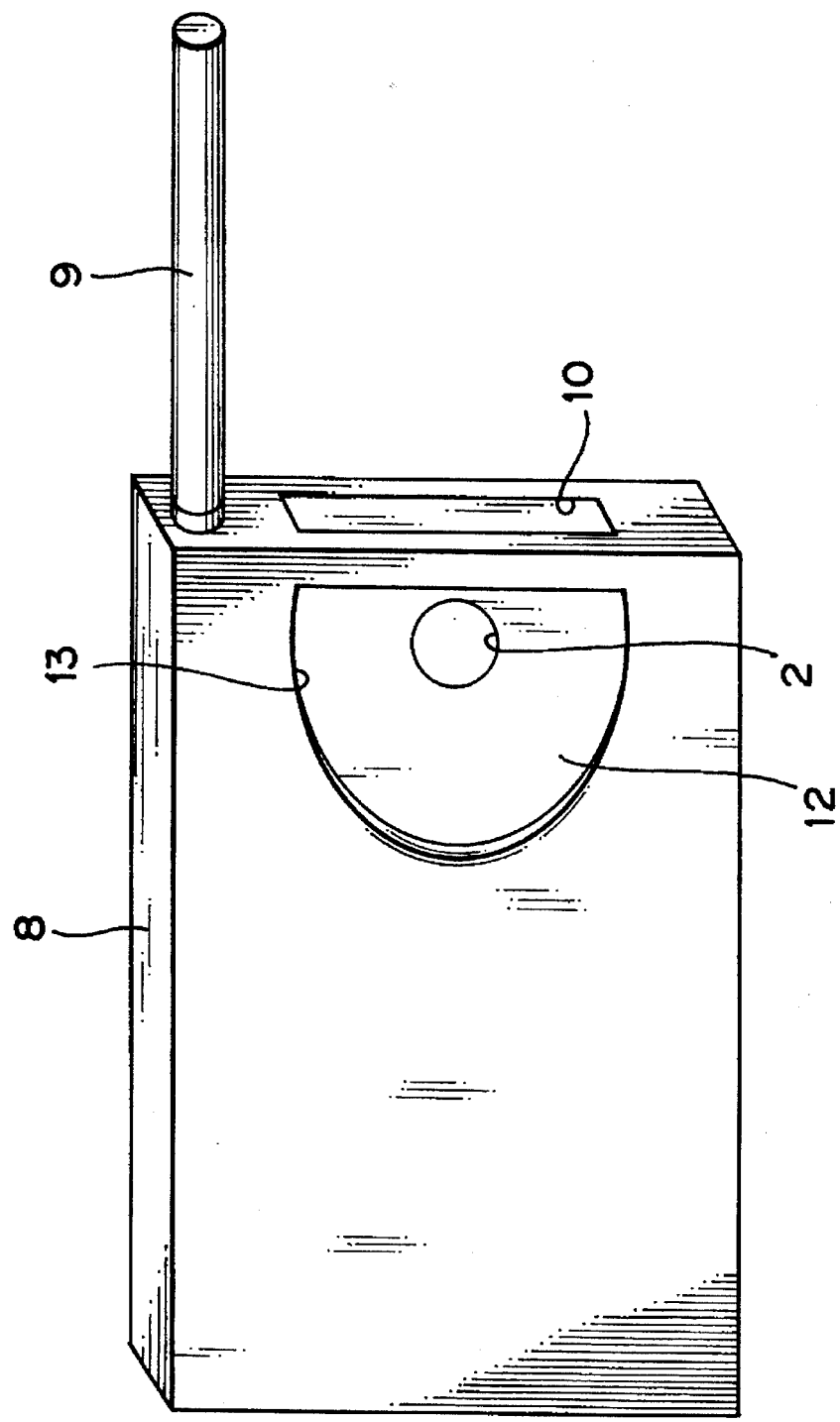
FIG. 12 is a perspective view showing the portable information device and image sensing cartridge of the second embodiment after they are docked.

FIGS. 10–12 are diagrams for describing a second embodiment of the invention, in which FIG. 10 is a view showing the internal construction of the image sensing cartridge, FIG. 11 is a perspective view showing the portable information device and image sensing cartridge before they are docked, and FIG. 12 is a perspective view showing the portable information device and image sensing cartridge after they are docked.

In this embodiment, as shown in FIG. 10, the DC-DC converter 6 inside an image sensing cartridge 12 is placed in the proximity of the optical system 3, namely near the opening 2, and, as illustrated in FIG. 11, the side of the portable information device 8 is formed to have an opening 13 of large size.

More specifically, the arrangement is such that after the image sensing cartridge 12 and portable information device 8 are docked, as shown in FIG. 12, the opening 2 of the image sensing cartridge 12 will fall within the opening 13 of the portable information device 8. At the same time, the opening 13 of the portable information device is enlarged up to the proximity of a position corresponding to the DC-DC converter 6 of the image sensing cartridge 12.

By virtue of this arrangement, the heat radiating property of the portion corresponding to the DC-DC converter 6, which can be a problem when heat is produced, is improved. Though the DC-DC converter 6 is placed close to the optical system 3 in this embodiment, other components that can pose problems when heat is produced, such as a voltage regulator or the drive IC for the image sensing element, may also be placed near the optical system.

(Third Embodiment)

Figure 13:
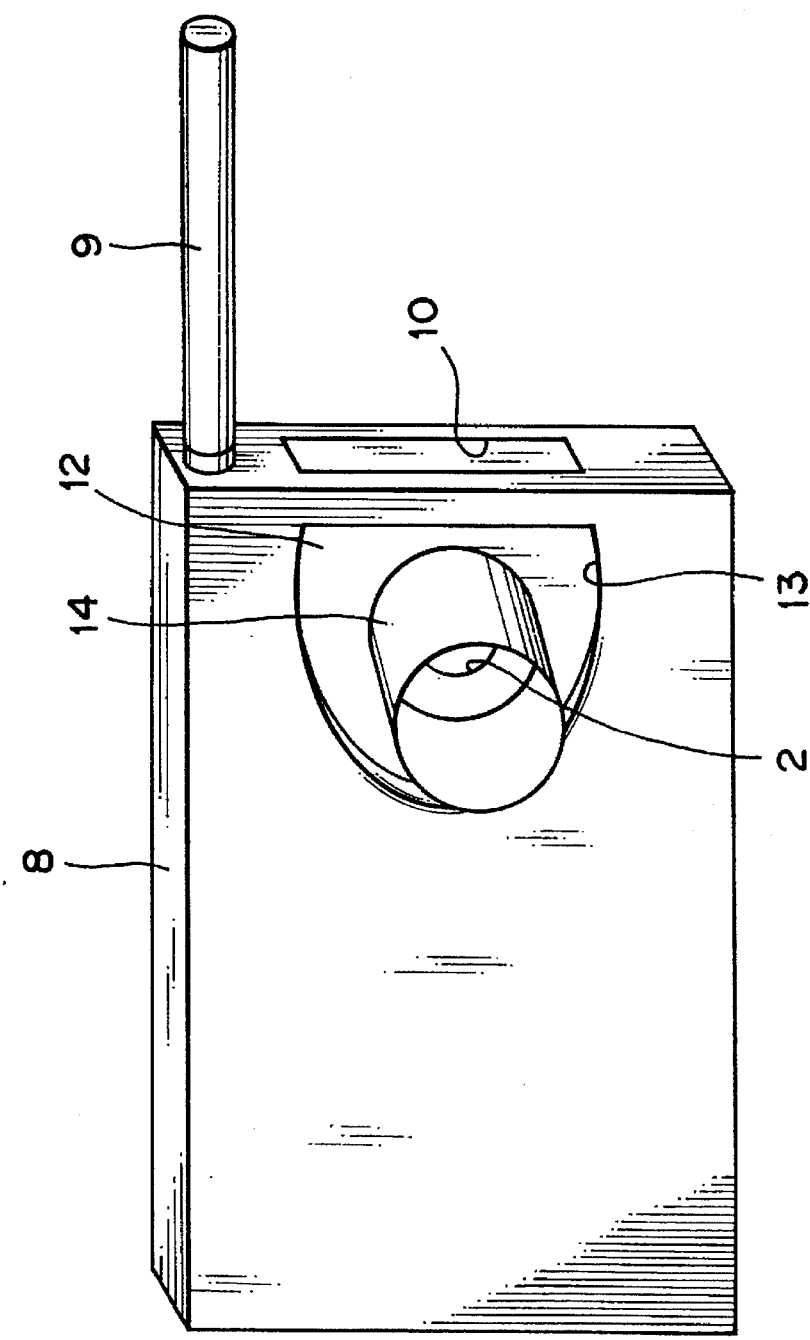
FIG. 13 is a perspective view showing the portable information device and image sensing cartridge of the third embodiment after they are docked.

FIG. 13 is a diagram for describing a third embodiment of the invention. This is a perspective view showing the portable information device and image sensing cartridge before they are docked.

In this embodiment, as opposed to the second embodiment, a separate optical member 14 is freely detachably mounted in the opening 2 of the image sensing cartridge 12 through the opening 13 in the portable information device 8, thereby making it possible to mount a lens that requires some thickness, such as a zoom lens.

According to this embodiment, the separate optical member 14 is mounted in the image sensing cartridge 12. However, in a modification of this embodiment, use may be made of a zoom lens of the type in which the lens portion is caused to recede into the main body of the image sensing cartridge 12 when a short focal distance is needed and lens portion is made to protrude when a is employed. When the image sensing cartridge 12 is mounted in and removed from the portable information device 8 in such an arrangement, this can be performed with the lens portion in the retracted state (often the state in which the focal length is short).

Figure 14:
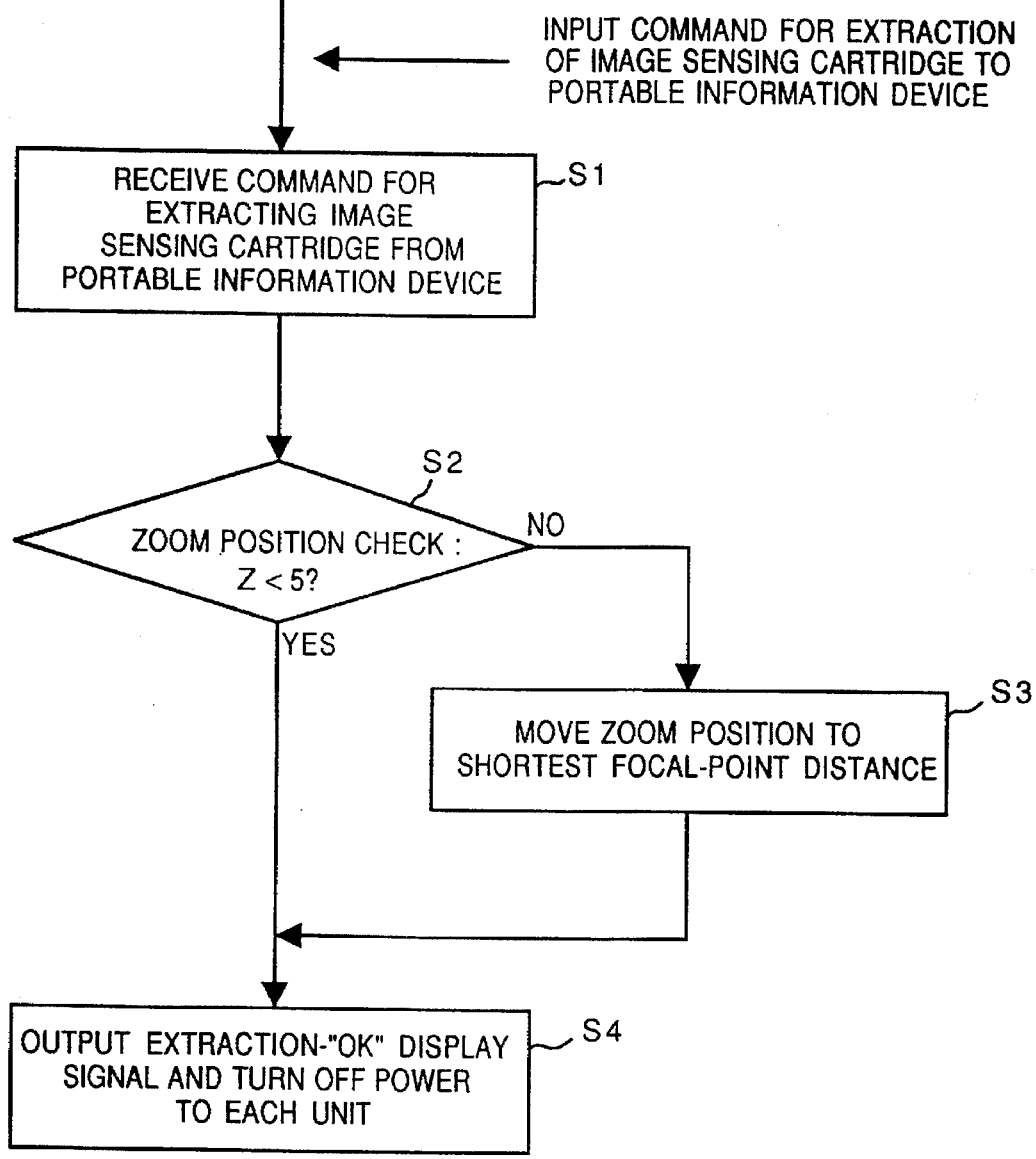
FIG. 14 is a flowchart for describing the operation of a modification of the third embodiment.

FIG. 14 is a flowchart for describing the operation of this modification. When the image sensing cartridge 12 is detached from the portable information device 8, the operation illustrated in FIG. 14 is executed by the CPU 41 on the side of the image sensing cartridge 12. More specifically, when the fact that the image sensing cartridge 12 is to be unloaded is entered on the side of the portable information device 8, the image sensing cartridge 12 receives a signal indicating that a command has been entered from the side of the portable information device 8 (step S1). The CPU 41 checks whether the zoom position prevailing at this time is on the short focal-length side or the long focal-length side relative to fixed home position. If a numerical value Z indicating the home position is less than five, this means that the zoom position is on the short focal-length side, which is the position at which the image sensing cartridge 12 can be loaded and unloaded as is (step S2). Accordingly, if Z<5 holds, an indication is given to the effect that the cartridge may be unloaded as is. In addition, power to each component is turned off (step S4). If Z<5 does not hold, then the zoom position is moved to the shortest focal-length side (step S3), after which the indication to the effect that the cartridge may be unloaded is presented. In this modification, the zoom position is moved to the shortest focal-length distance in FIG. 14 (step S3). However, it is obvious that the zoom position may be moved to any point at which there will be no impediment when the cartridge is unloaded.

(Fourth Embodiment)

Figure 15:
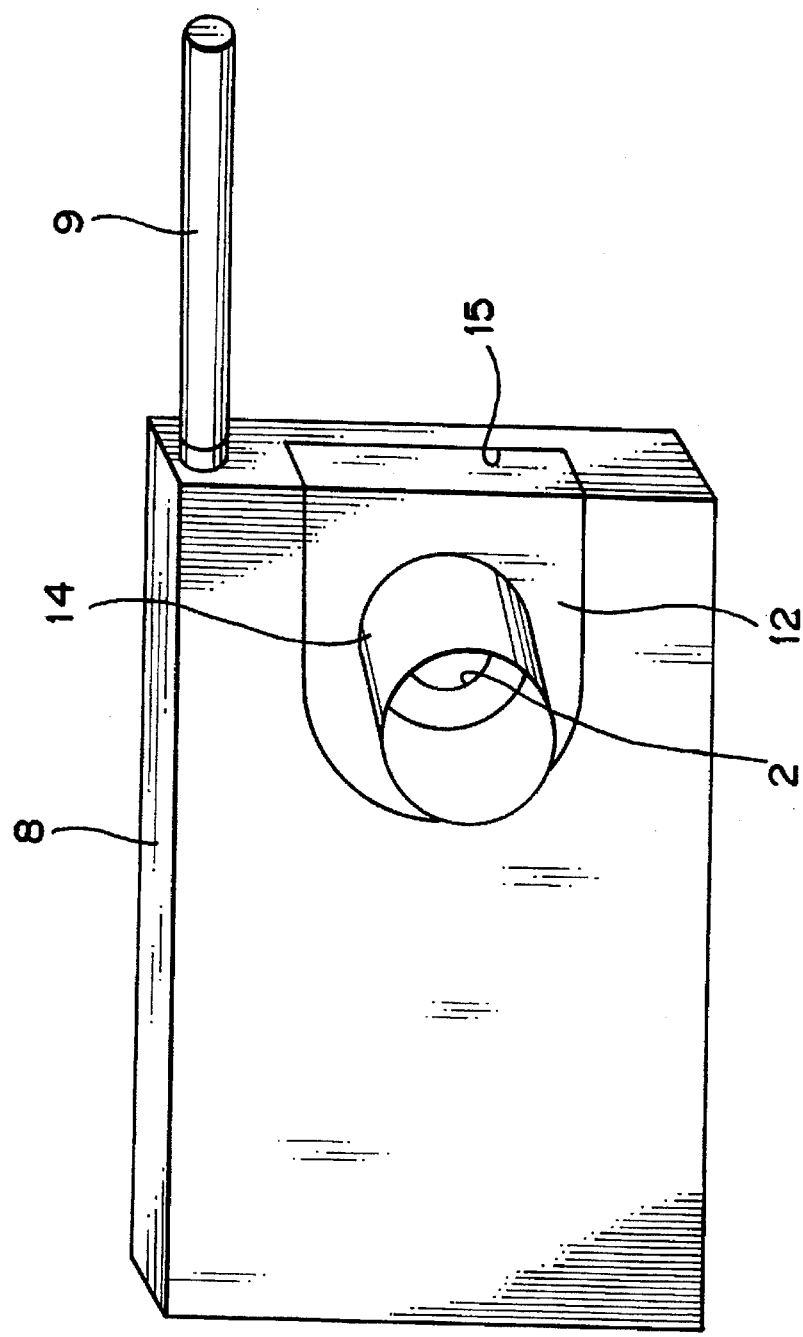
FIG. 15 is a perspective view showing the portable information device and image sensing cartridge of a fourth embodiment after they are docked.

FIG. 15 is a diagram for describing a fourth embodiment of the invention. This is a perspective view showing the portable information device and image sensing cartridge after they are docked.

In this embodiment, as opposed to the third embodiment, the cartridge insertion port 10 and opening 13 of the portable information device 8 are formed as a continuous opening 15. As a result of this arrangement, the image sensing cartridge 12 can be loaded in and unloaded from the portable information device 8 with a lens requiring some thickness, such as the aforementioned zoom lens, being left protruding from the cartridge.

(Fifth Embodiment)

Figure 16:
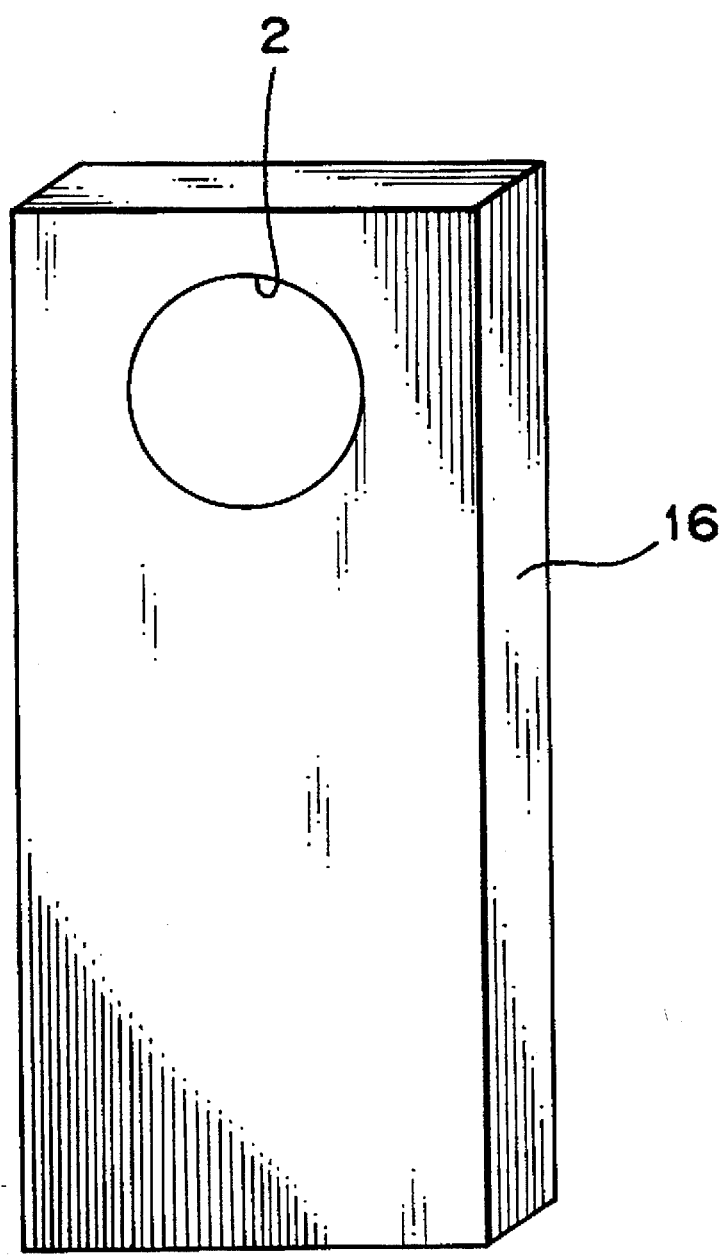
FIG. 16 is a perspective view of an image sensing cartridge according to a fifth embodiment of the present invention.
Figure 17:
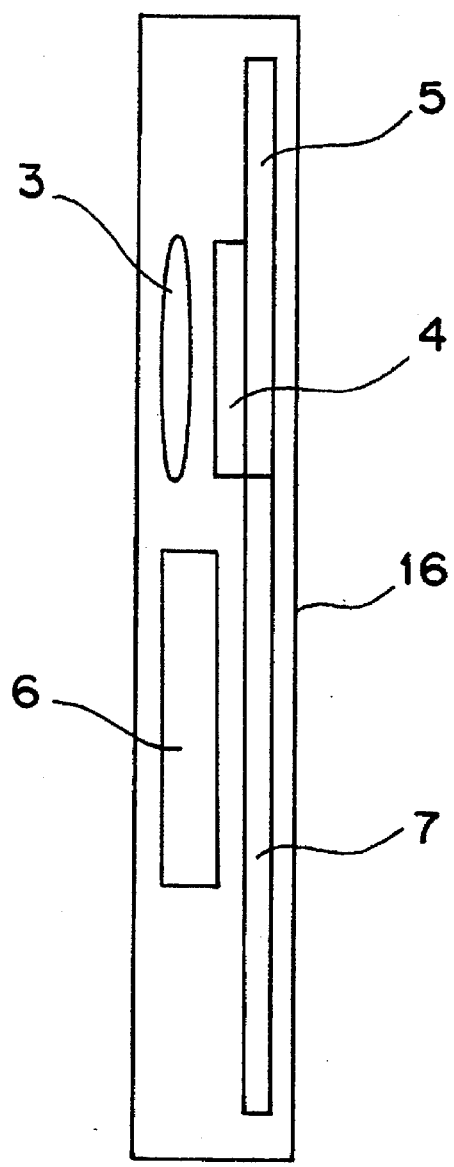
FIG. 17 is a view showing the internal construction of the image sensing cartridge according to the fifth embodiment.
Figure 18:
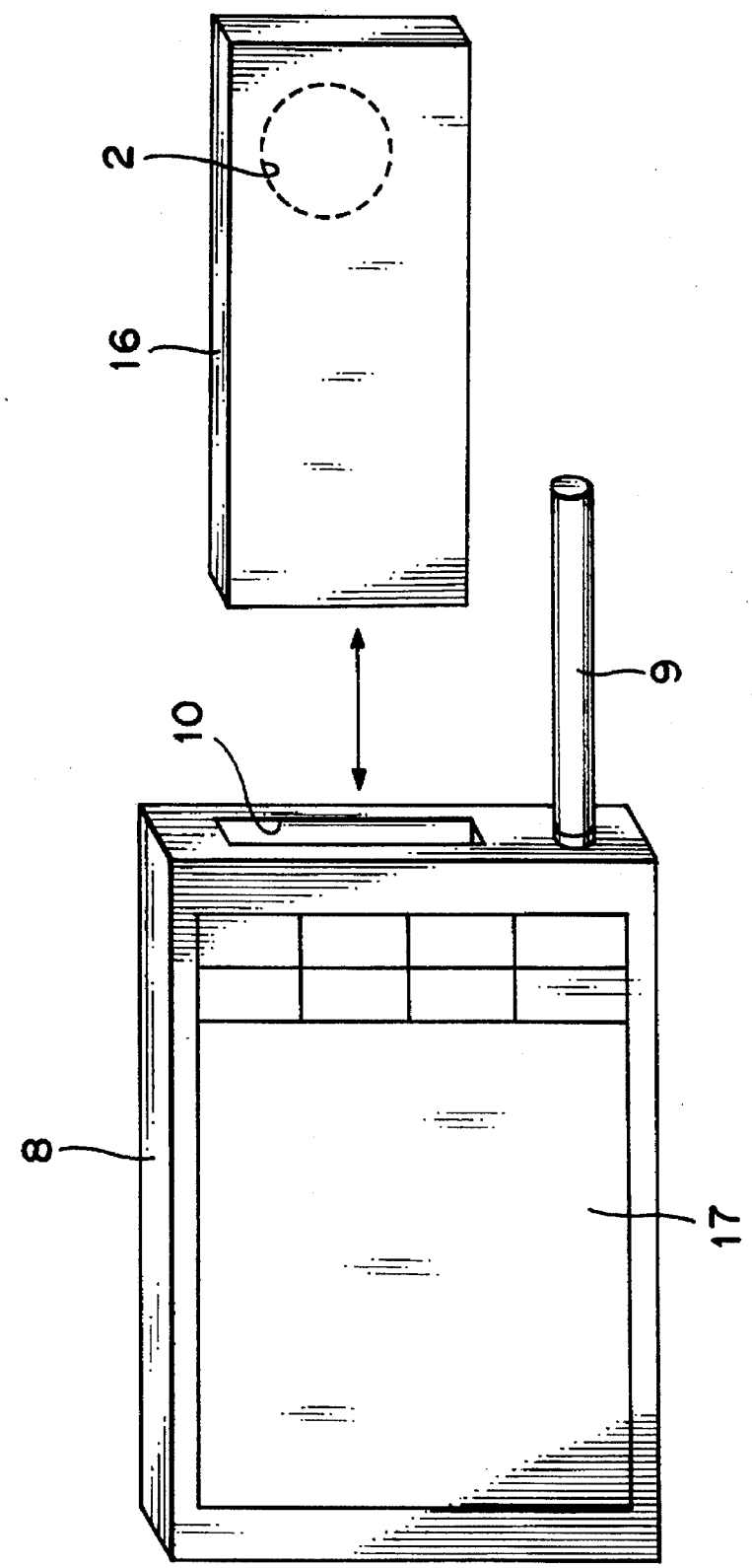
FIG. 18 is a perspective view showing the portable information device and image sensing cartridge of the fifth embodiment before they are docked.
Figure 19:
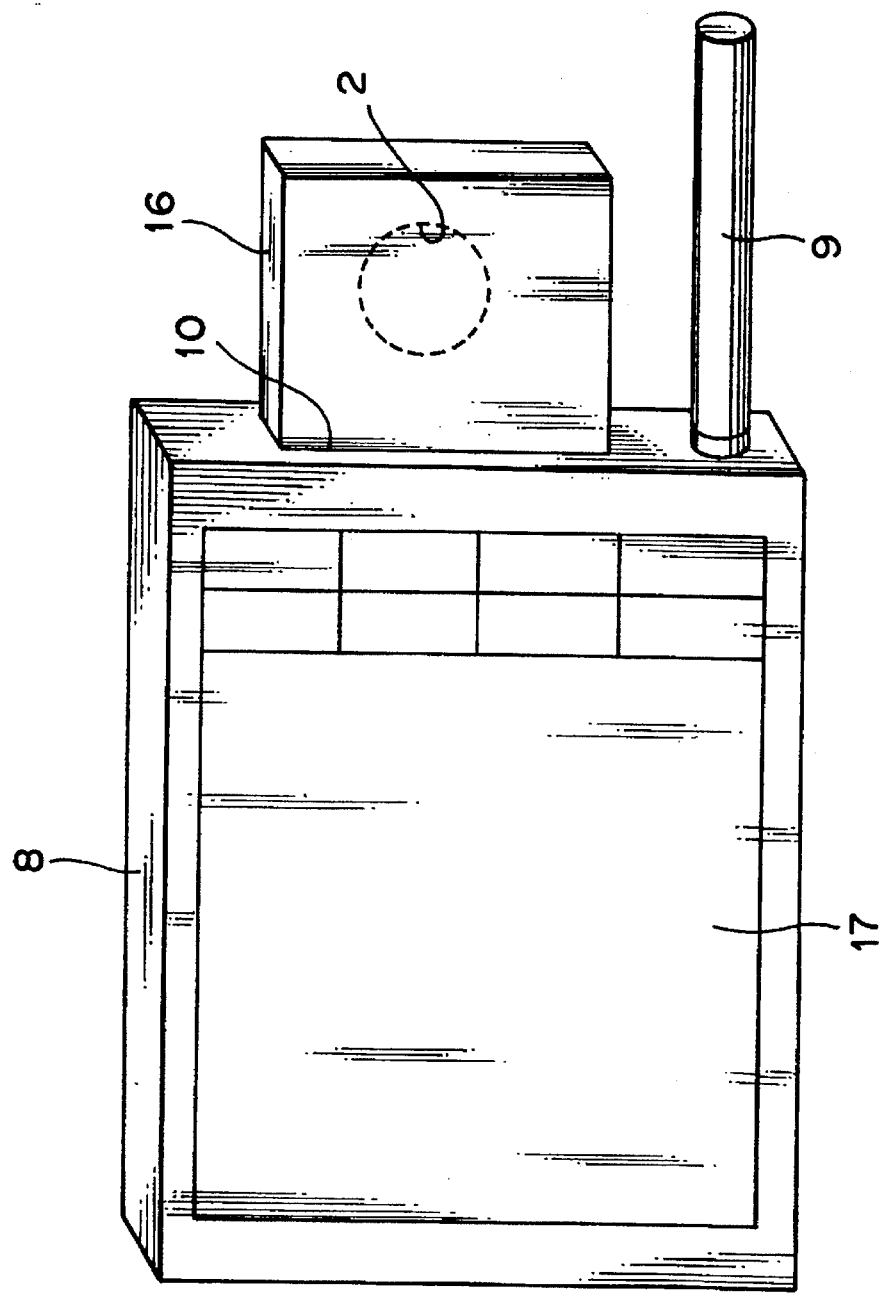
FIG. 19 is a perspective view showing the portable information device and image sensing cartridge of the fifth embodiment after they are docked.

FIGS. 16~19 are diagrams for describing a fifth embodiment of the invention, in which FIG. 16 is a perspective view of an image sensing cartridge according to a fifth embodiment, FIG. 17 is a view showing the internal construction of the image sensing cartridge, FIG. 18 is a perspective view showing the portable information device and image sensing cartridge before they are docked, and FIG. 19 is a perspective view showing the portable information device and image sensing cartridge after they are docked.

In this embodiment, as shown in FIG. 16, the long side of an image sensing cartridge 16 is made larger than that of the image sensing cartridge of the foregoing embodiment, and the opening 2 is formed in the upper part of the image sensing cartridge 16 in the side face thereof. In FIGS. 18 and 19, the portable information device 8 has a display unit for displaying various information.

FIG. 19 illustrates the image sensing cartridge 16 and the portable information device 8 when they are docked. According to this arrangement, the opening 2 of the image sensing cartridge 16 projects from the insertion port 10 of the portable information device 8, as a result of which it is possible for the diameter of the opening 2 of image sensing cartridge 16 to be made sufficiently larger than the length of the short side of the insertion port 8. Accordingly, as shown in FIG. 17, it is possible for the image sensing cartridge 16 to employ the optical system and image sensing element 4 of large diameter.

Figure 20:
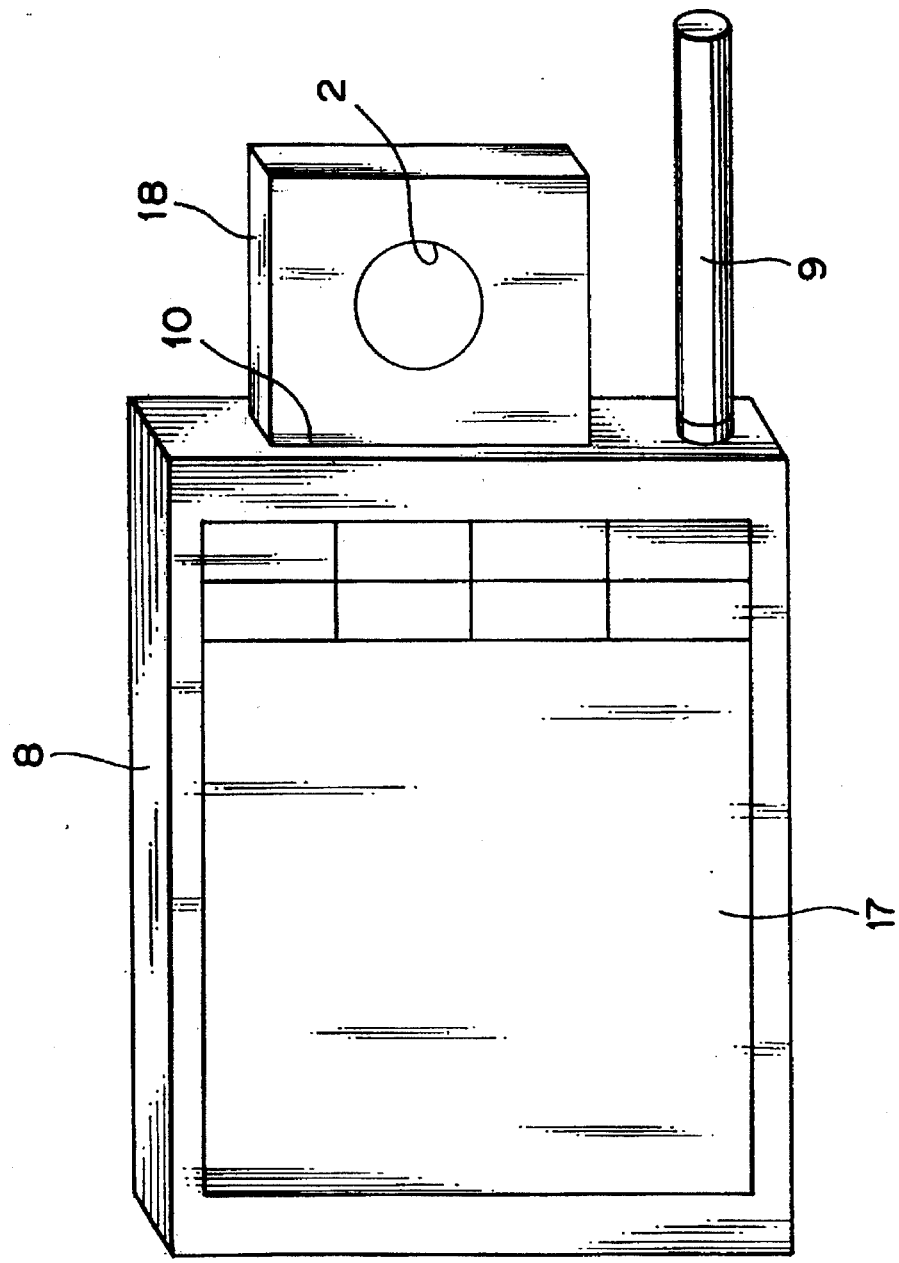
FIG. 20 is a perspective view showing the portable information device and image sensing cartridge of a modification of the fifth embodiment after they are docked.

In FIG. 19, the opening 2 of the image sensing cartridge 16 faces away from the display unit 17 of the portable information device 8. However, as shown in the modification of FIG. 20, an image sensing cartridge 18 may be used in which the opening 2 faces in the same direction as the display unit 17. Using the image sensing cartridge 18 makes it possible to apply the cartridge to a TV telephone.

Figure 21:
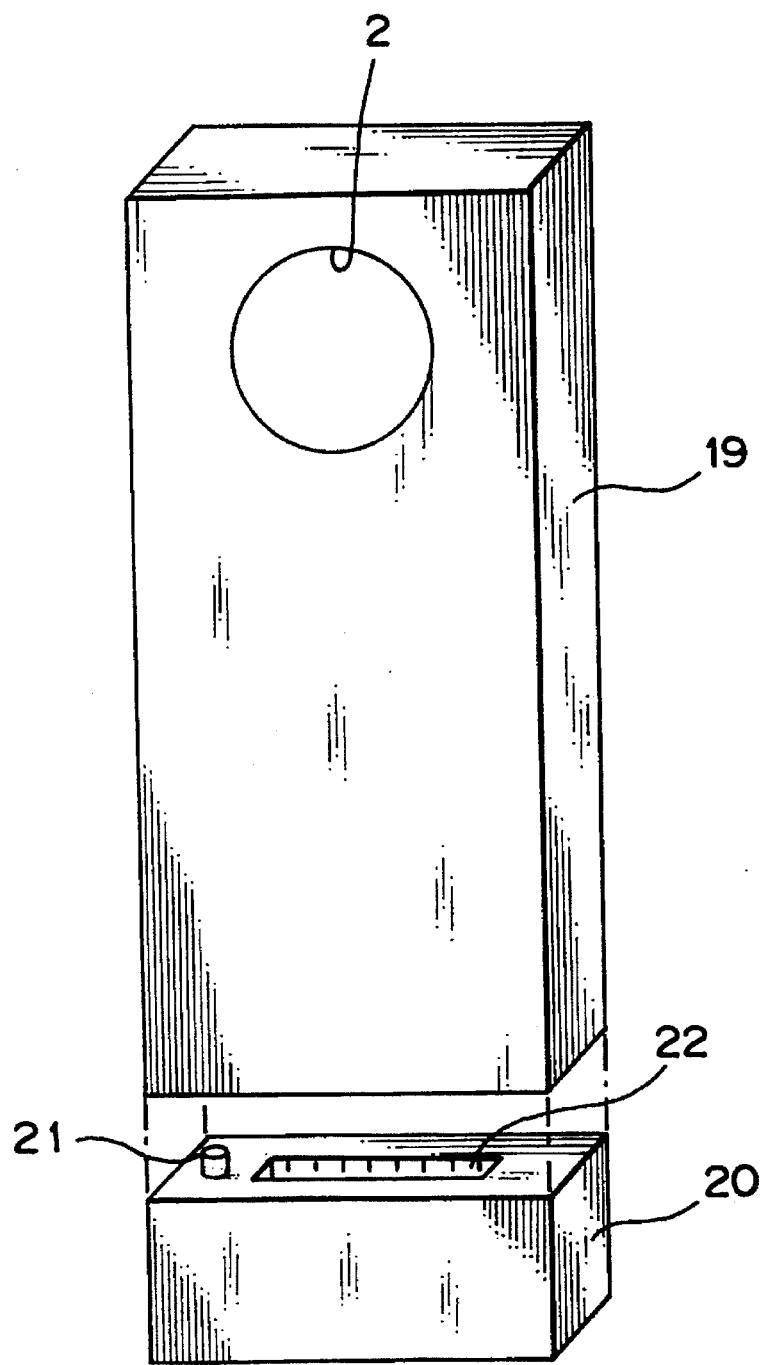
FIG. 21 is a perspective view showing an image sensing cartridge and a converting adapter in the modification of the fifth embodiment.
Figure 22A:
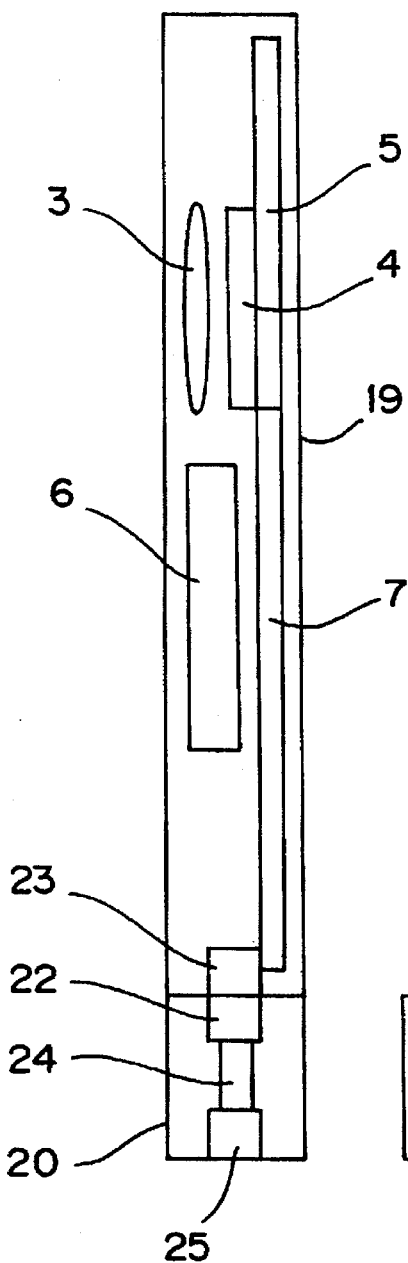
FIGS. 22A and 22B are views showing the internal construction of an image sensing cartridge and a converting adapter in another modification of the fifth embodiment.
Figure 22B:
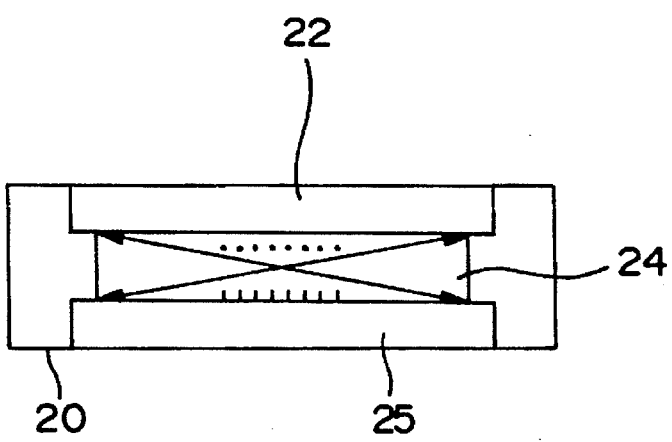

Further, an image sensing cartridge of the type shown in FIGS. 16~19 may be used in combination with a converting adapter, as illustrated in FIGS. 21, 22A and 22B, which converts the pin array to an exactly opposite array. This makes it possible for the same image sensing cartridge to support both a camera application and a TV telephone application.

FIG. 21 is a perspective view showing an image sensing cartridge and a converting adapter in this modification, and FIGS. 22A and 22B are views showing the internal construction of the same.

In FIG. 21, numeral 20 denotes a converting adapter that makes it possible to use an image sensing cartridge 19 faced in either of two exactly opposite directions, and numeral 21 denotes a projection for detecting that the converting adapter 20 has been connected to the image sensing cartridge 19. The converting adapter 20 has a connector 22. As shown in FIGS. 22A and 22B, the image sensing cartridge 19 has a connector 23, a pin-array converting substrate 24 and a connector 25 for connecting the converting adapter 20 and the portable information device 8.

When the image sensing cartridge 19 is inserted into the portable information device 8 via the converting adapter 20, the pin array for the signals from the image sensing cartridge 19 is made exactly opposite by the converting adapter 20 so that the cartridge can be used even if it is loaded in the portable information device 8 in the opposite direction. Furthermore, when loading is performed, the projection 21 of the converting adapter 20 is detected by the image sensing cartridge 19 and specific information is written at a specific address of a memory inside the image sensing cartridge 19. As a result, the fact that the converting adapter 20 has been attached is transmitted to the portable information device 8 so that a changeover is made to the corresponding software, such as software for a TV telephone. Though the detection of the converting adapter 20 is performed by the image sensing cartridge 19 mechanically, an arrangement may be adopted in which this is detected on the side of the portable information device 8. In addition, detection can be performed electrically rather than mechanically.

Thus, in accordance with the foregoing embodiment, the image sensing cartridges 16, 18 and 19, which have the optical system 3 and image sensing element 4 of large diameter, can be utilized upon being loaded in the portable information device 8 without taking any special measures on the side of the portable information device 8. Accordingly, so long as the specifications of the card interface are observed, a variety of portable information devices can accept the image sensing cartridges. This means that there will be a large increase in the number of image sensing cartridges 16, 18 and 19 that can be loaded as well as an increase in fields of application. In addition, since the image sensing cartridges 16, 18 and 19 partially project from the portable information device 8, it is easier to extract the cartridges.

(Sixth Embodiment)

Figure 23:
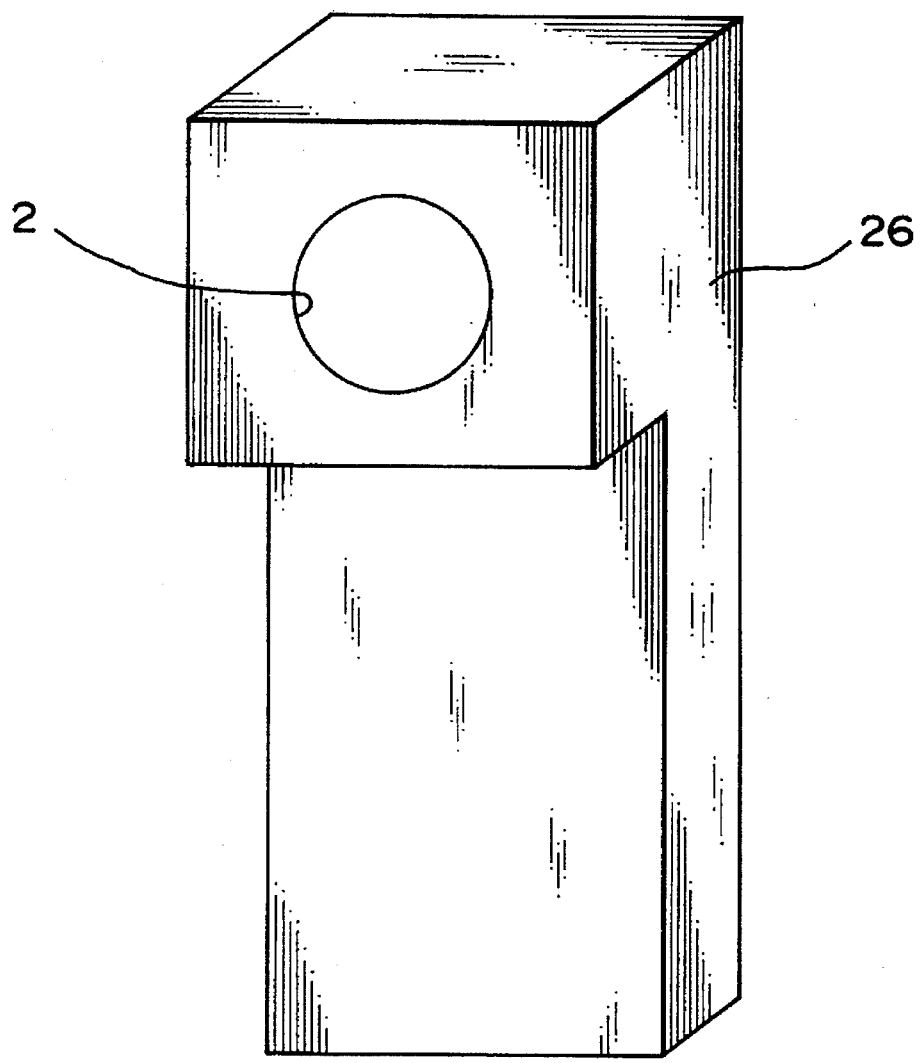
FIG. 23 is a perspective view of an image sensing cartridge according to a sixth embodiment of the present invention.
Figure 24:
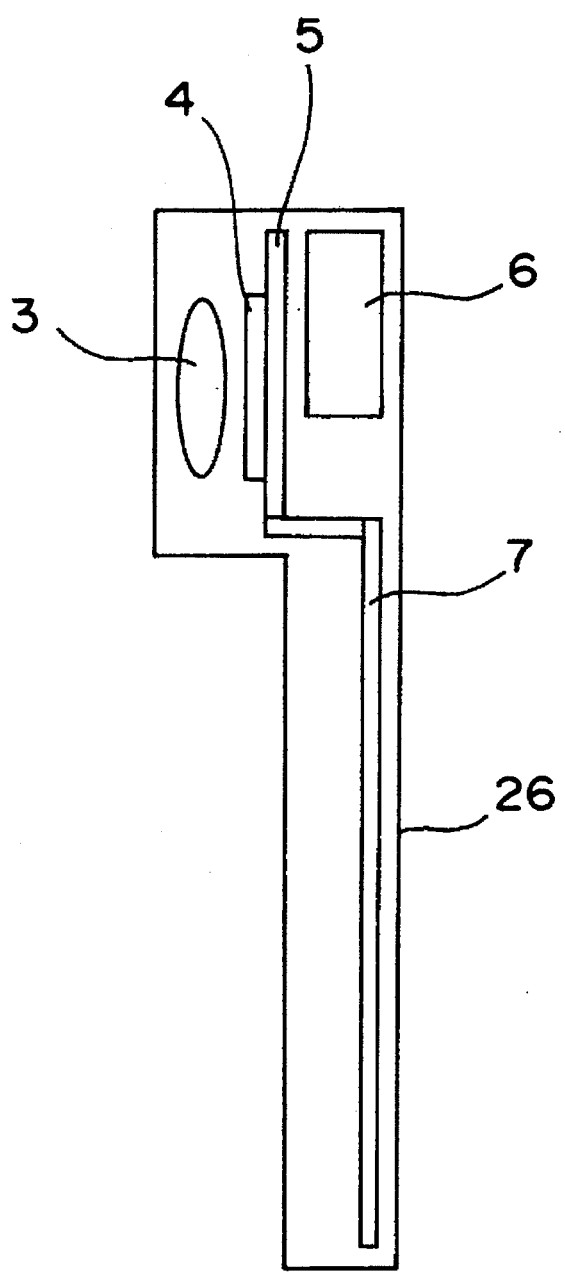
FIG. 24 is a view showing the internal construction of the image sensing cartridge according to the sixth embodiment.
Figure 25:
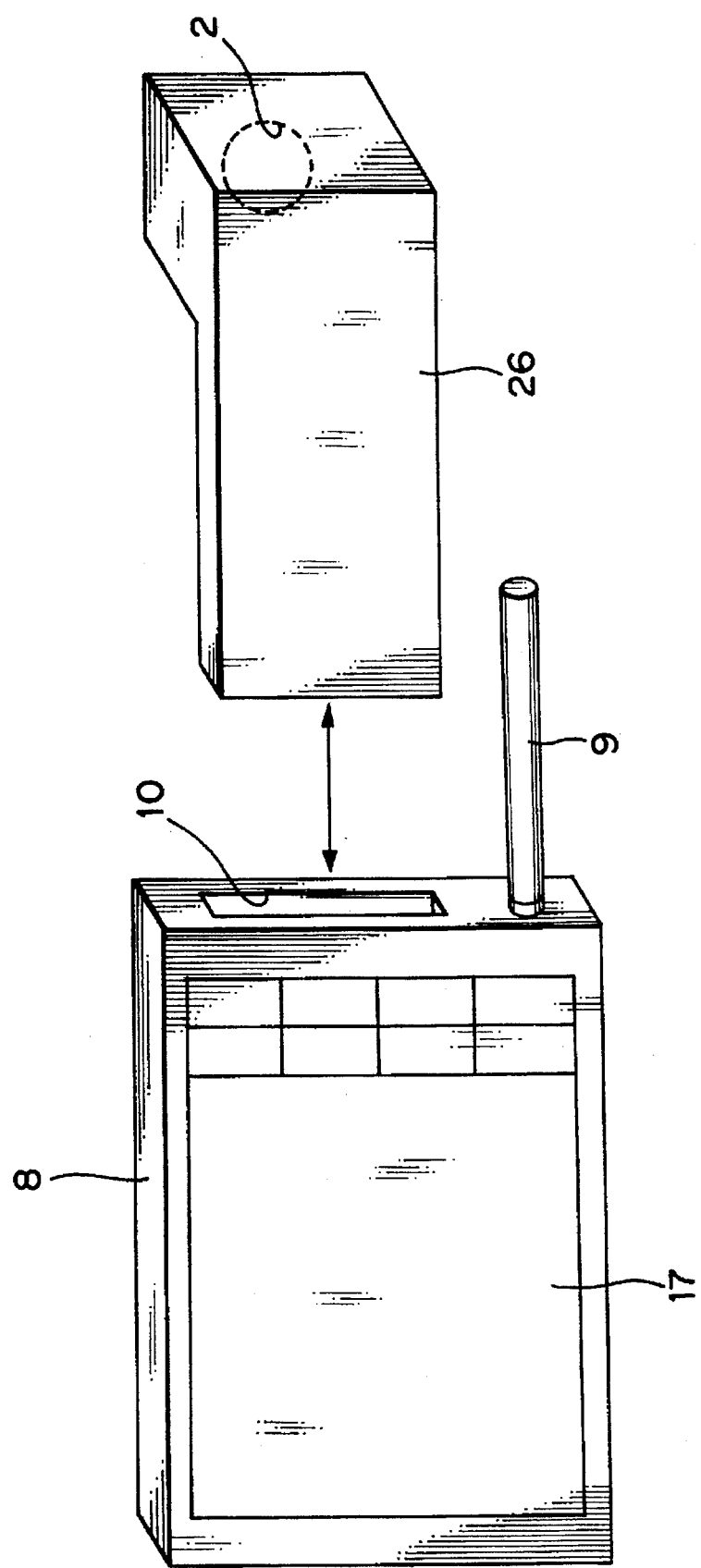
FIG. 25 is a perspective view showing the portable information device and image sensing cartridge of the sixth embodiment before they are docked.
Figure 26:
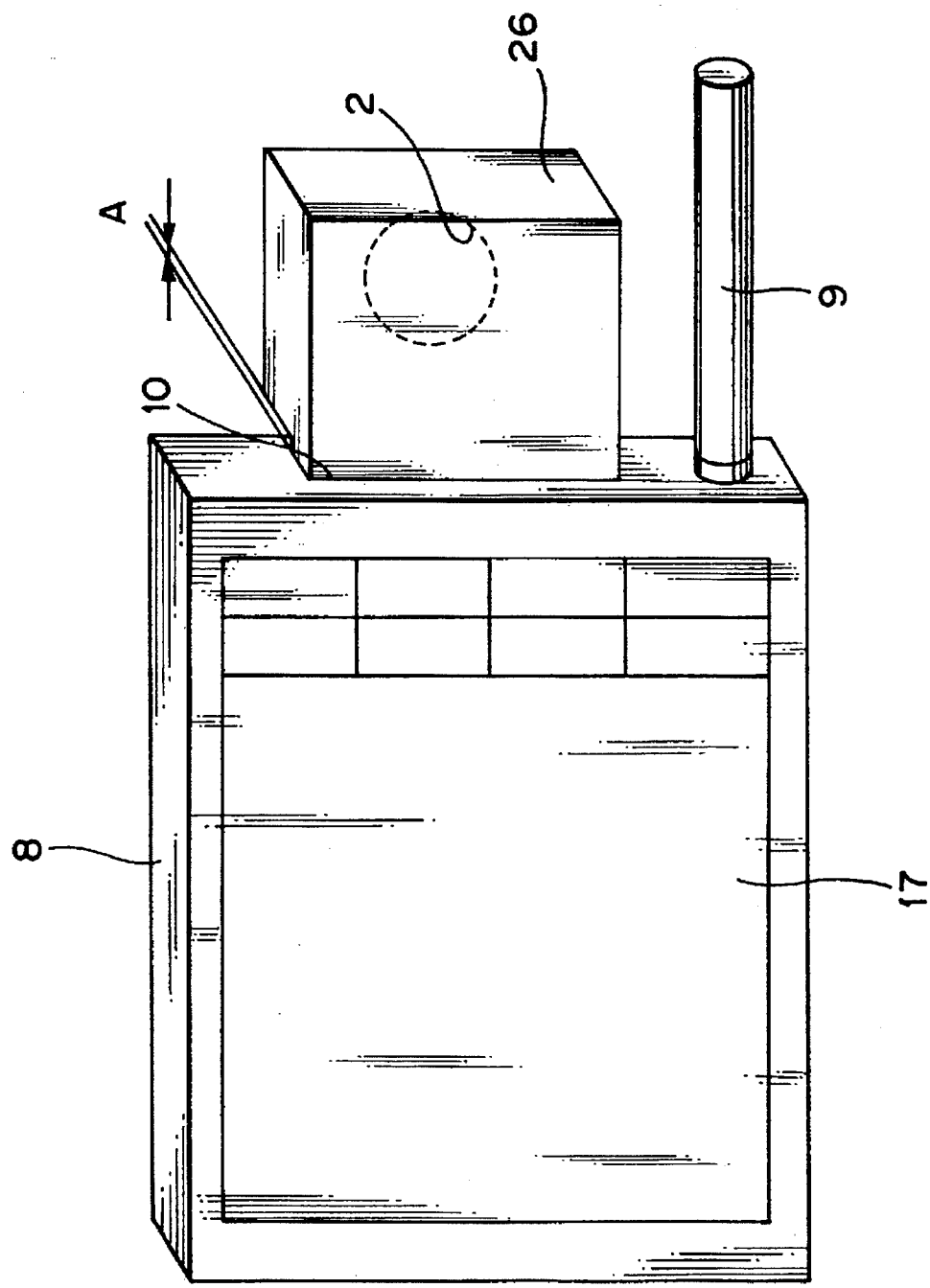
FIG. 26 is a perspective view showing the portable information device and image sensing cartridge of the sixth embodiment after they are docked.

FIGS. 23~26 are diagrams for describing a sixth embodiment of the invention, in which FIG. 23 is a perspective view of an image sensing cartridge, FIG. 24 is a view showing the internal construction of the image sensing cartridge, FIG. 25 is a perspective view showing the portable information device and image sensing cartridge before they are docked, and FIG. 26 is a perspective view showing the portable information device and image sensing cartridge after they are docked.

In this embodiment, as opposed to the fifth embodiment, the portion of an image sensing cartridge 26 that projects from the portable information device 8 is formed to be thicker than the portion that is inserted into the portable information device 8. Furthermore, as shown in FIG. 24, the optical system 3, image sensing element 4, substrate 5, DC-DC converter 6 and regulator, etc., are placed in the projecting portion of enlarged thickness.

As a result, the following advantages are obtained in addition to those of the fifth embodiment:

① It is easy to realize the mechanism necessary in the depth direction of the optical system 3, such as the zoom lens.

② Components that generate a large quantity of heat, such as the drive circuit of the image sensing element 4, the DC-DC converter 6 and the regulator, can be placed on the projecting portion. Accordingly, the effects of heat generated by the image sensing cartridge 26 will not be transmitted to the side of the portable information device 8.

③ In addition to ② above, the projecting portion can be provided with a large volume. This facilitates the radiation of heat from the parts that produce heat.

④ Since the projecting portion is thick, other members (e.g., a strobe unit and other image sensing units) can readily be mounted on the image sensing cartridge 26.

Figure 27:
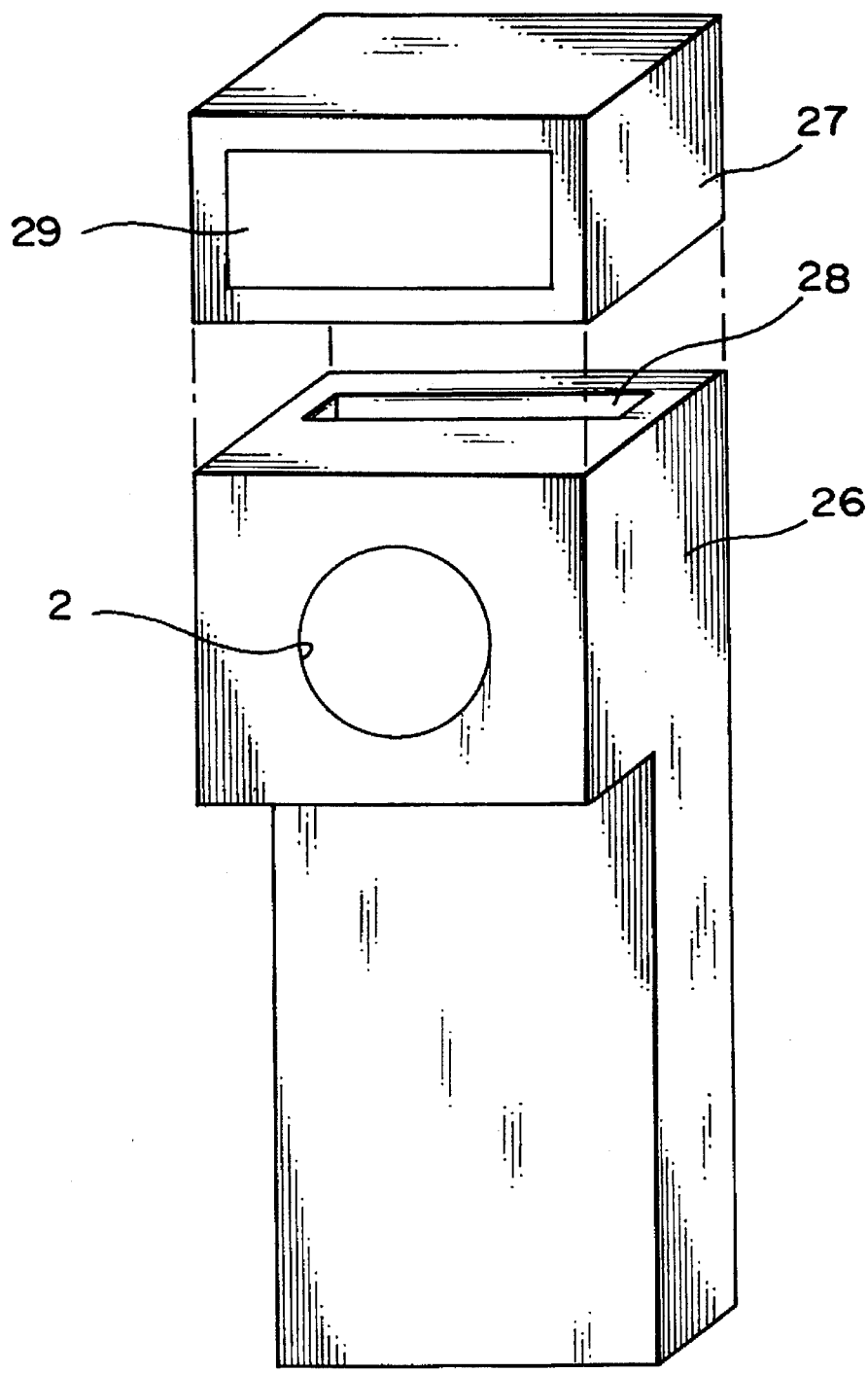
FIG. 27 is a perspective view showing an image sensing cartridge and a strobe unit in a modification of the sixth embodiment.
Figure 28:
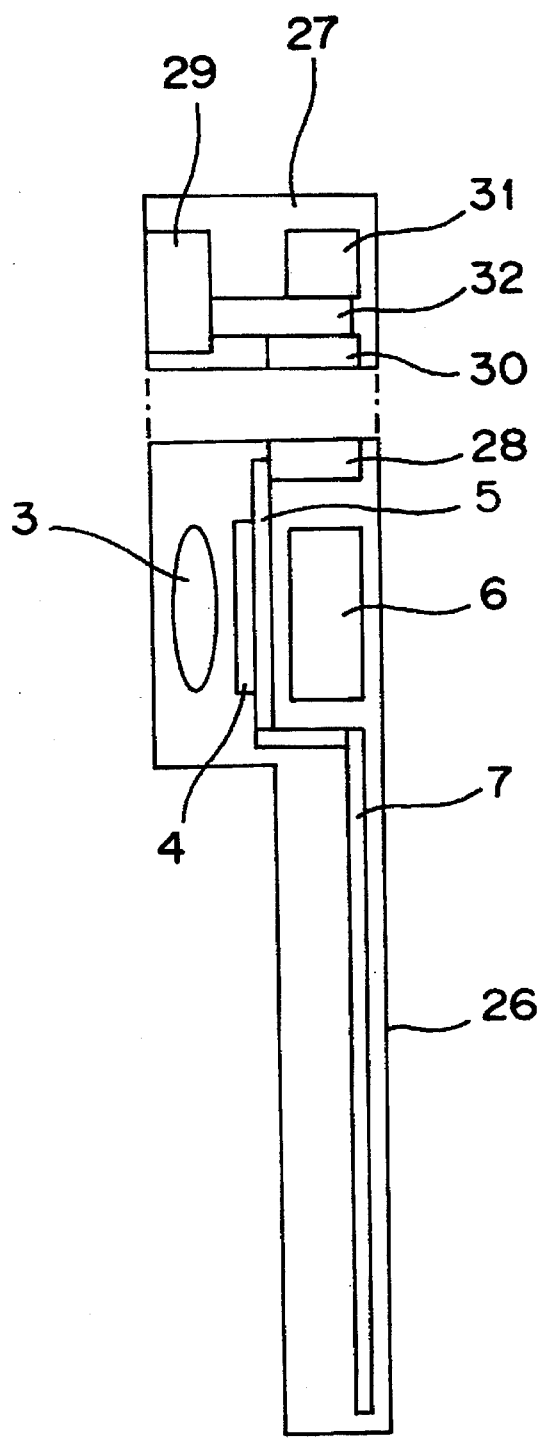
FIG. 28 is a view showing the internal construction of the image sensing cartridge and strobe unit in the modification of the sixth embodiment.
Figure 29:
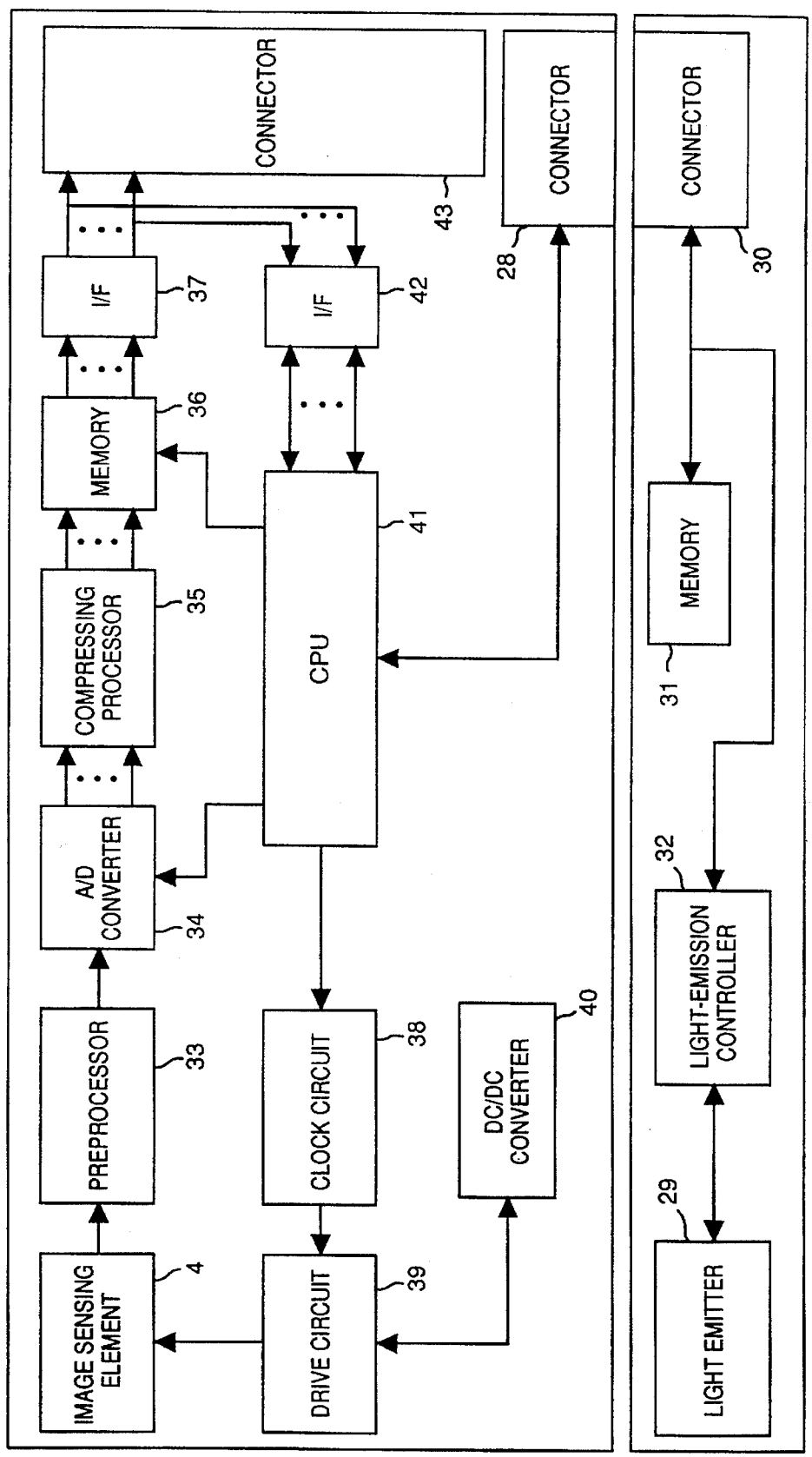
FIG. 29 is an electrical block diagram showing the image sensing cartridge and strobe unit in the modification of the sixth embodiment.

Item ④ above will be described with reference to FIGS. 27~29. FIG. 27 is a perspective view showing an image sensing cartridge and a strobe unit, FIG. 28 is a view showing the internal construction of the image sensing cartridge and strobe unit, and FIG. 29 is an electrical block diagram showing the image sensing cartridge and strobe unit.

Shown in FIG. 27 are the image sensing cartridge 26, a strobe unit 27, a connector 28 for connecting the strobe unit 27 to the image sensing cartridge 26, and a light-generating portion 29. In FIG. 28, numeral 30 denotes a connector, 31 a memory containing information for informing the image sensing cartridge 26 of the fact that the strobe unit 27 has been mounted, and 32 a light-emission controller.

In the arrangement described above, the information from the memory 31 inside the strobe unit 27 is sent to the CPU 41 when the image sensing cartridge 26 and strobe unit 27 are connected via the connectors 28 and 30. The CPU 41 detects this information, changes the operating program of the image sensing cartridge 26 over to a strobe photography mode and executes strobe photography in conformity with subject luminance information detected by the image sensing cartridge 26. Accordingly, if the luminance of the subject is lower than a fixed level, a command is applied to the light-emission controller 32 of the strobe unit 27 to cause the light-emitting portion 29 to emit light.

In FIG. 26 of the sixth embodiment, the projecting portion of the image sensing cartridge 26 and the portable information device 8 are spaced away from each other by a distance A. However, by making the distance A as close to zero as possible, it is possible for the user to visually verify whether the image sensing cartridge 26 has been fully inserted into the portable information device 8. An additional effect is that it is difficult for dust and other contaminants to accumulate in the portable information device 8.

(Seventh Embodiment)

Figure 30:
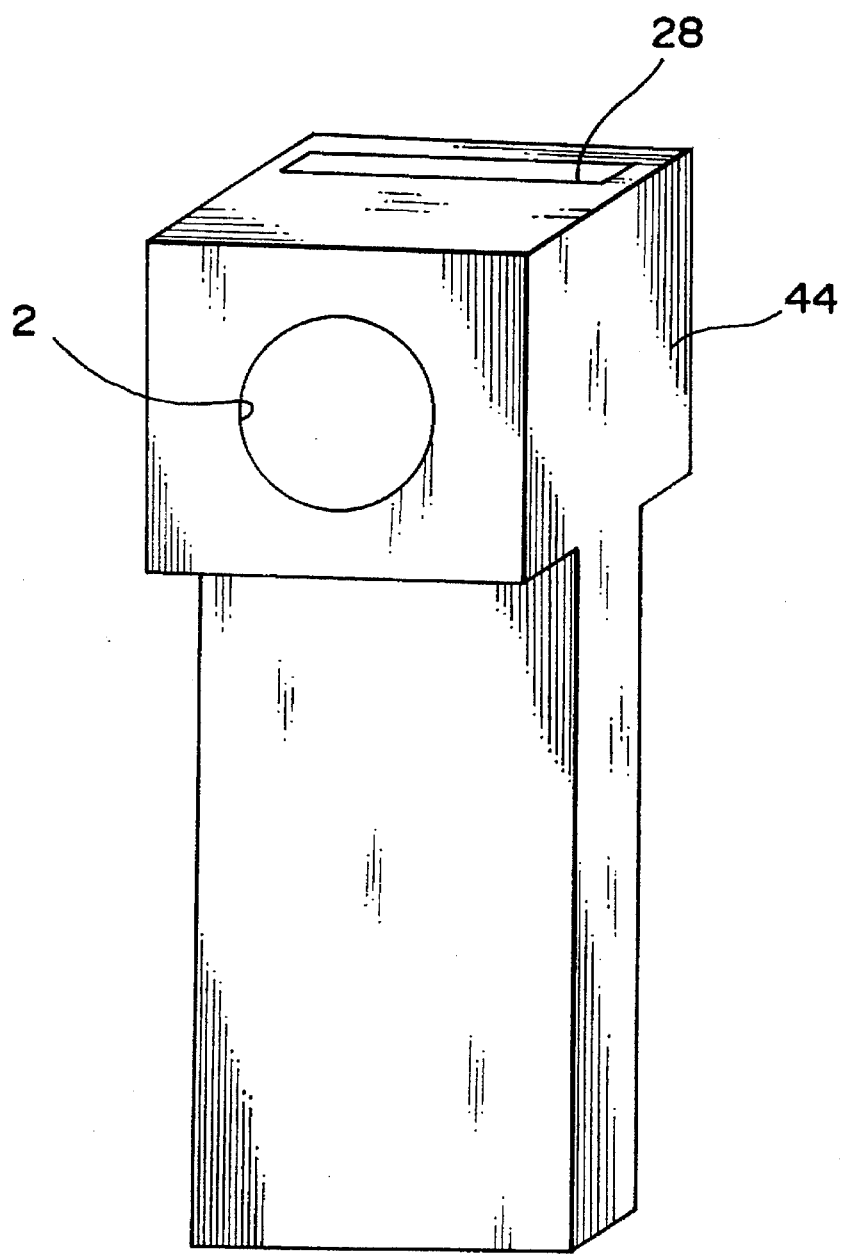
FIG. 30 is a perspective view of an image sensing cartridge according to a seventh embodiment of the present invention.
Figure 31:
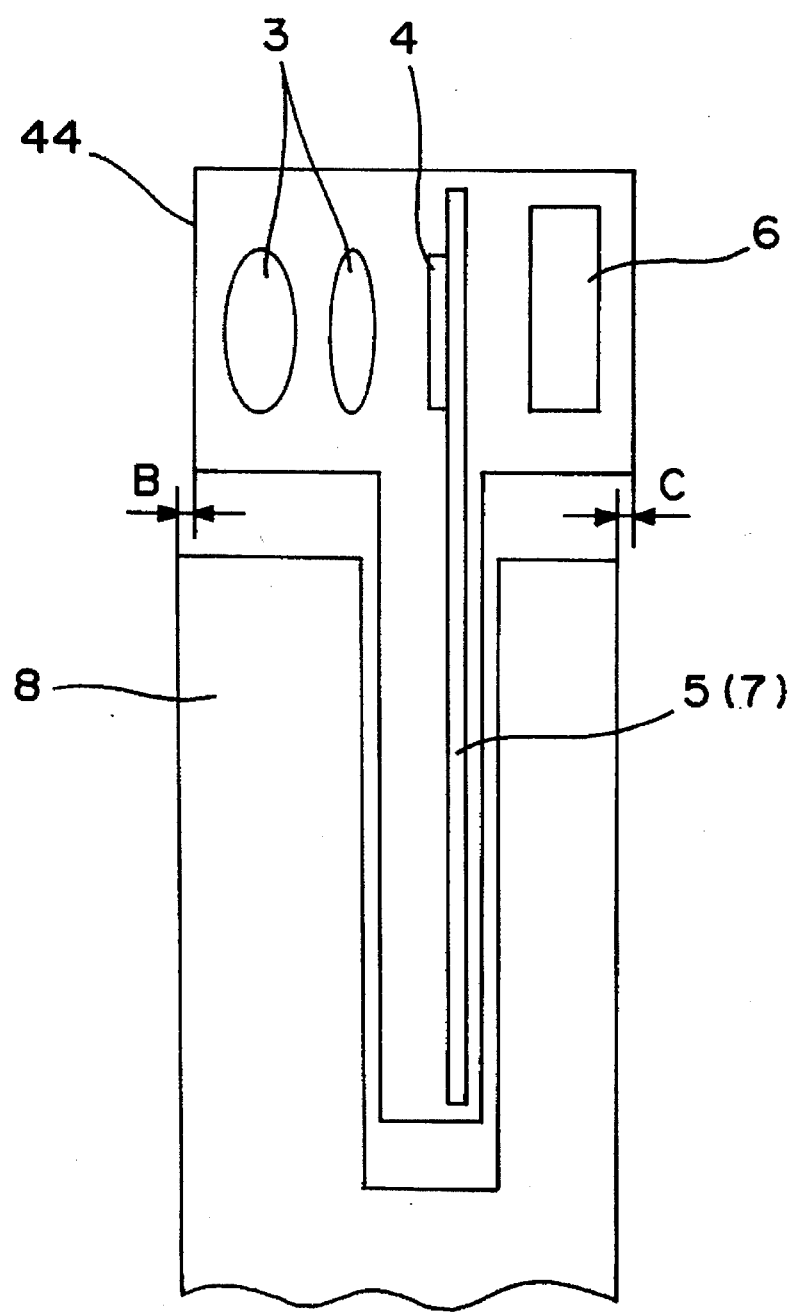
FIG. 31 is a view showing the internal construction of the image sensing cartridge according to the seventh embodiment.

FIGS. 30 and 31 are diagrams for describing a seventh embodiment of the present invention, in which FIG. 30 is a perspective view of and image sensing cartridge and FIG. 31 is a view showing the internal construction of the same.

In an image sensing cartridge 44 according to this embodiment, the thickness of the portion projecting from the portable information device 8 is increased and the thickness of the image sensing cartridge 44 on the side opposite the opening 2 also is increased. The optical system 3 is placed on one side of the thickened portion, an image sensing element 4 and DC-DC converter 6 are placed on the other side of the thickened portion, and the substrates 5 and 7, which mount the clock IC and drive IC for driving the image sensing element 4 and process the output of the image sensing element 4 in such a manner that it may be handled by the portable information device 8, are placed at the central part of the thickened portion.

As a result of this configuration, the image sensing element 4, its drive circuitry and processing circuitry can all be mounted on the single circuit substrate 5 (7) easier than in the sixth embodiment. In addition, this is extremely effective in terms of mounting and with regard to the placement of component parts.

In the sixth and seventh embodiments, the thicknesses of the image sensing cartridge 26 and projecting portion 44 are made less than the thickness of the portable information device 8, and the surfaces of the image sensing cartridge 26 and projecting portion 44 do not protrude from the surface of portable information device 8, thereby making it possible for the cartridge and device to be docked without detracting from the portability of the portable information device, 8, stability when it is mounted, independence and storability. By designing the thicknesses of the image sensing cartridge 26 and projecting portion 44 so that the lengths B, C shown in FIG. 31 become substantially zero (only B in the sixth embodiment), the cartridge and device can be docked without a step portion being produced between the image sensing cartridge 26 and projecting portion 44 and the portable information device 8. By adopting this arrangement, the portability of the image sensing element, its stability and independence when mounted and the storability thereof are improved further when the image sensing cartridge 26 and projecting portion 44 are docked with the portable information device 8.

(Eighth Embodiment)

Figure 32:
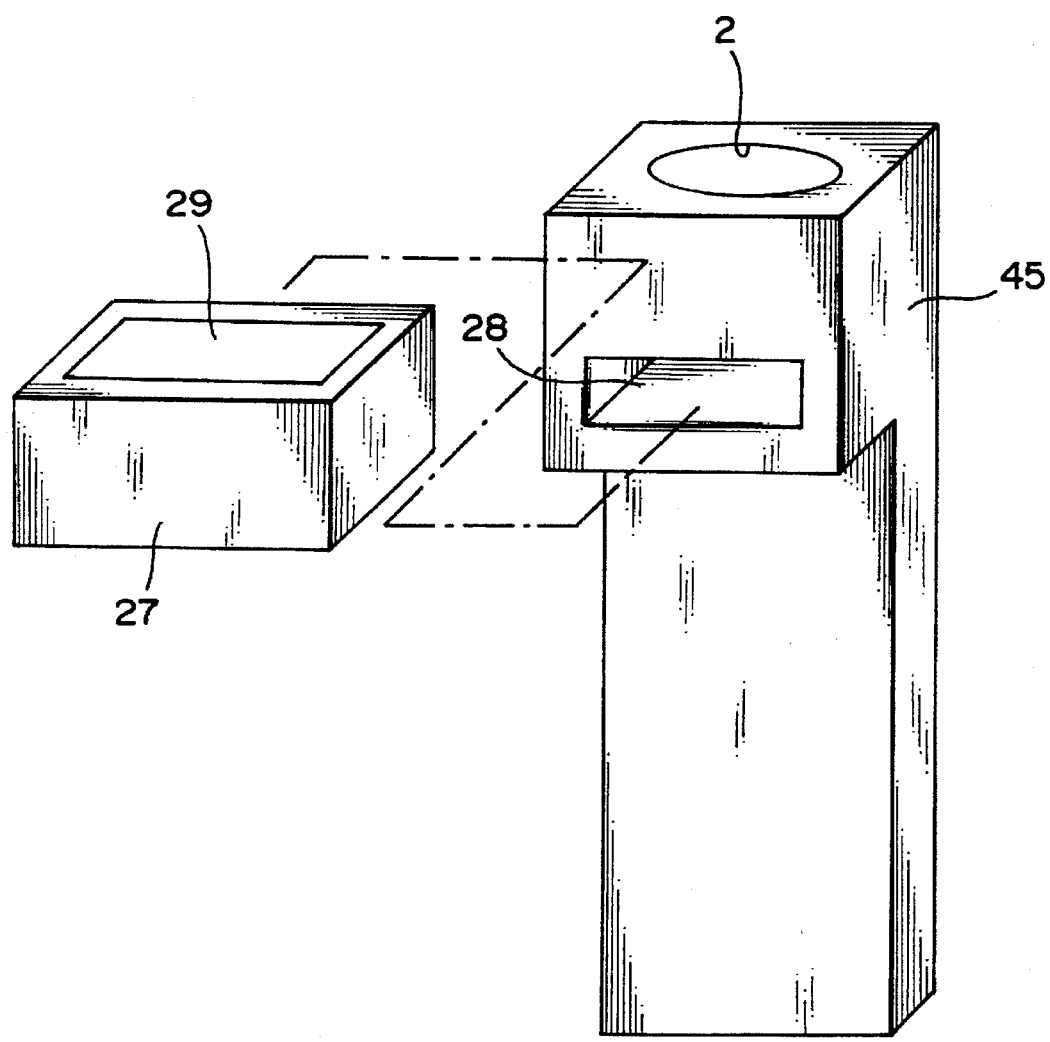
FIG. 32 is a perspective view showing an image sensing cartridge and a strobe unit according to an eighth embodiment of the invention.
Figure 33:
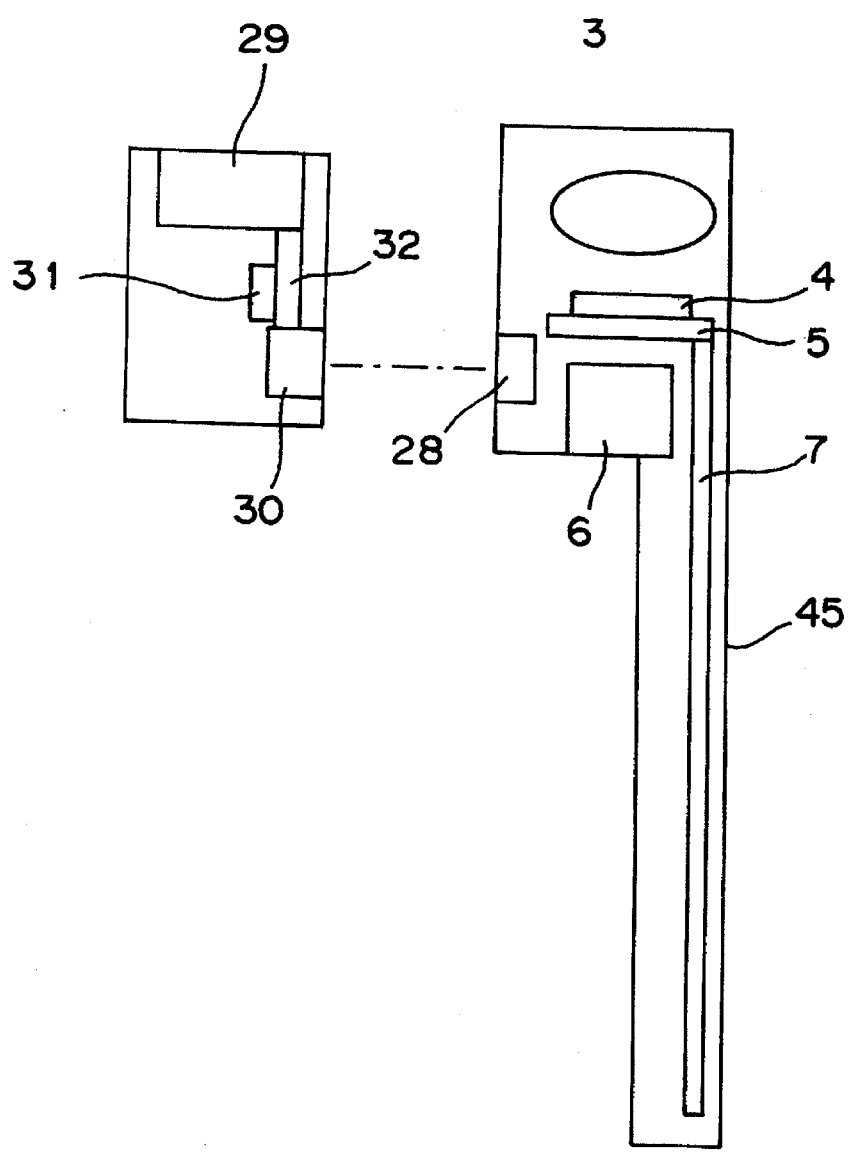
FIG. 33 is a view showing the internal construction of an image sensing cartridge and strobe unit in the eighth embodiment of the invention.

FIGS. 32 and 33 are diagrams for describing the eighth embodiment of the invention, in which FIG. 32 is a perspective view of an image sensing cartridge and a strobe unit, and FIG. 31 is a view showing the internal construction of the same.

In an image sensing cartridge 45 according to this embodiment, as opposed to the sixth embodiment, the opening 2 of the image sensing cartridge 45 is faced in the longitudinal direction to change the direction in which image sensing is possible. In this example, the strobe unit 27 is mounted in the side face of the image sensing cartridge 45 so that the light-emitting portion 29 is faced in the image-sensing direction.

Thus, by making it possible to change the relationship between the orientation of the portable information device 8 and the image-sensing direction of the portable information device 45, the optimum holding manner can be set for the portable information device 8, which has the image sensing cartridge 45 loaded therein, depending upon a variety of circumstances.

(Ninth Embodiment)

Figure 34:
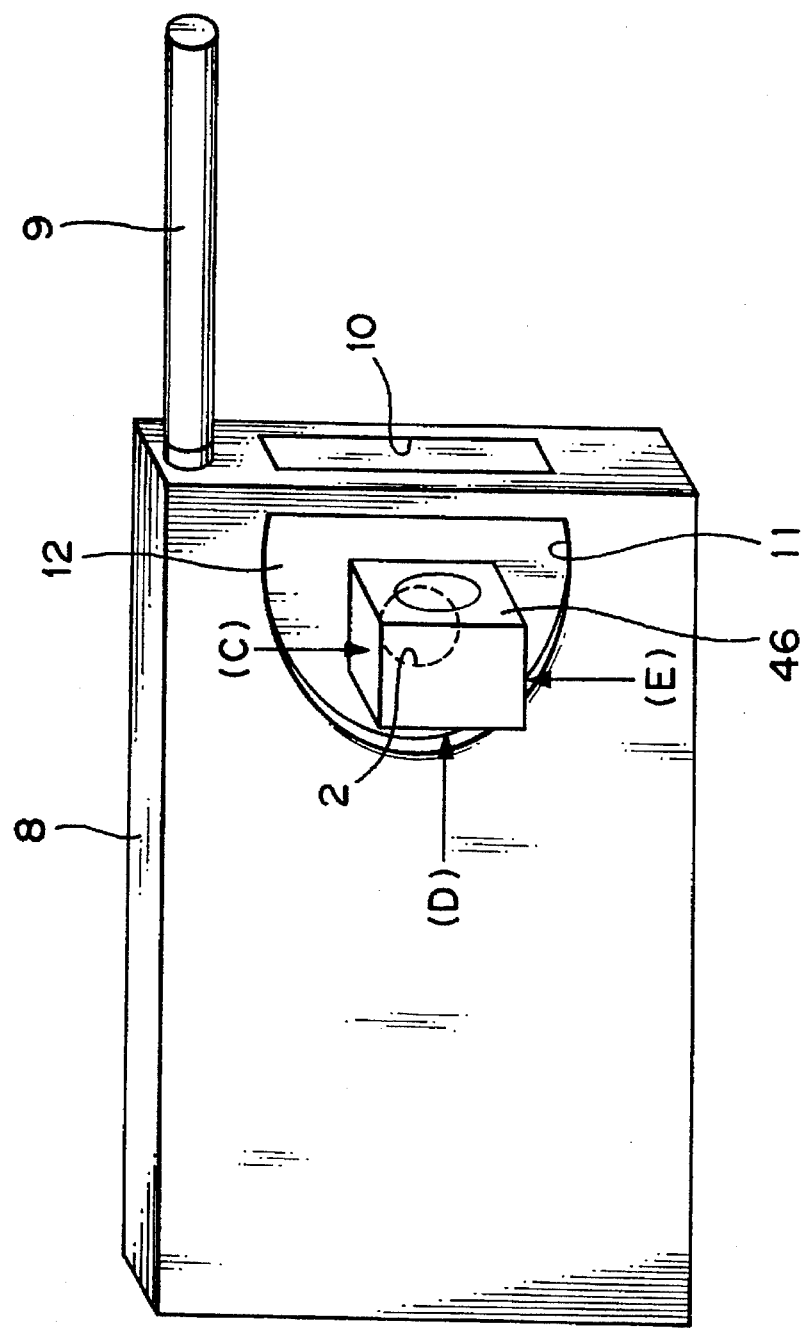
FIG. 34 is a perspective view showing the portable information device and image sensing cartridge of a ninth embodiment after they are docked.
Figure 35:
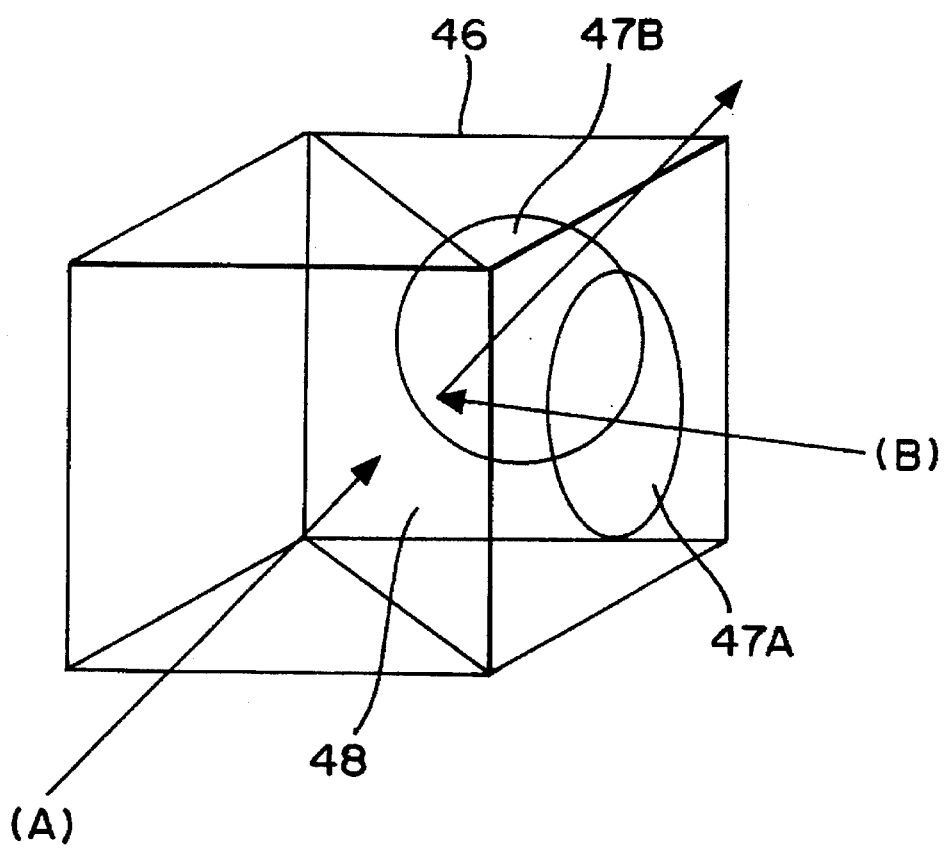
FIG. 35 is a diagram showing the arrangement of an opening-direction converter in the ninth embodiment.

FIGS. 34 and 35 are diagrams for describing a ninth embodiment of the invention, in which FIG. 34 is a perspective view of an portable information device and an image sensing cartridge after they are docked, and FIG. 35 is a view showing the arrangement of an opening-direction converter.

In FIG. 34, numeral 46 denotes an opening-direction converter having a full-reflection mirror. In FIG. 35, numeral 47A denotes a first opening for introducing light from a subject, 48 a full-reflection mirror for changing the angle of incidence of the light from the subject by approximately 90°, and 47B a second opening for introducing light from the subject to the image sensing cartridge 12.

In accordance with this embodiment, the opening-direction converter 46 is attached to the opening 2 of the image sensing cartridge 12. As a result, whereas it is possible to deal solely with subject light from the direction (A) in the first and second embodiments, this embodiment makes it possible to deal with subject light from the direction (B) as well.

Thus, by making it possible to change the relative relationship between the orientation of the portable information device 8 and the direction of the imaging optical axis of the image sensing cartridge 12, the portable information device 8 can be set so as to be held in the optimum manner in conformity with a variety of conditions. Further, the opening-direction converter 46 in FIG. 34 is capable of being rotated, thereby making it possible to image a subject in the directions of (C)~(E) of FIG. 29.

(Tenth Embodiment)

Figure 36C:
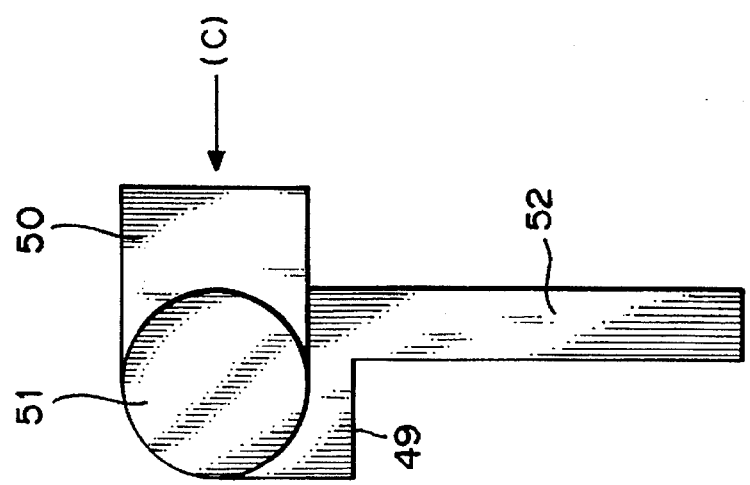
FIGS. 36A to 36C are external views of an image sensing cartridge according to a tenth embodiment of the invention.
Figure 36B:
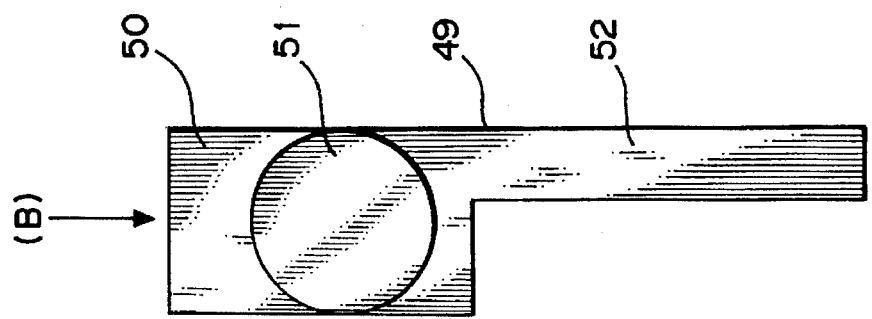
Figure 36A:
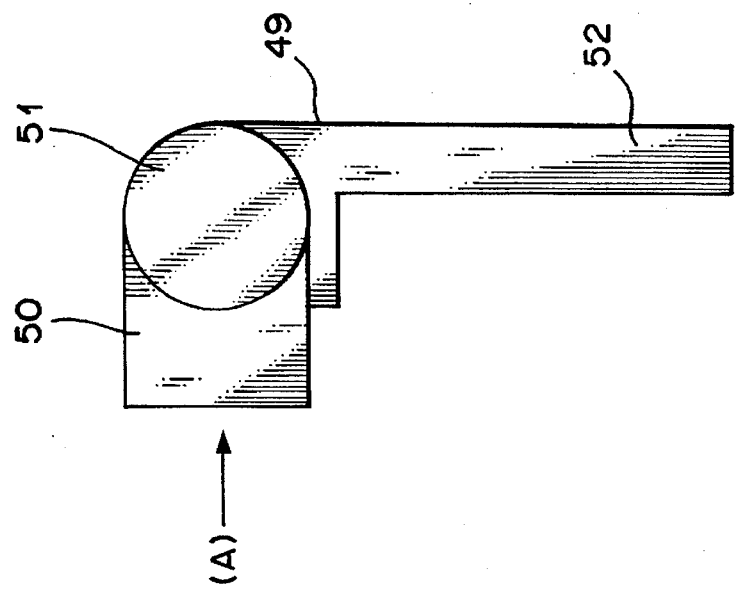

FIGS. 36A to 36C are diagrams for describing the tenth embodiment of the present invention and illustrates the external shape of an image sensing cartridge.

An image sensing cartridge 49 according to this embodiment has an image sensing head 50 internally incorporating an image sensing optical system and an image sensing element, a turning portion 51 that makes it possible to change the direction of the image sensing head 50, and an insertion portion 52 that is inserted into the portable information device 8.

According to this embodiment, as opposed to the sixth embodiment described above, turning the image sensing head 50 makes it possible to change the set direction of the opening with one and the same image sensing cartridge 49.

More specifically, a subject in the (A) direction is imaged in FIG. 36A and a subject in the (B) direction is imaged in FIG. 36B. Furthermore, a subject in the (C) direction is capable of being imaged in FIG. 36C. Thus, by making it possible to change the direction of the image-sensing optical axis of the image sensing cartridge 49 in conformity with a variety of conditions, the image sensing direction can be changed without changing the manner in which the portable information device 8 is held.

Further, as in the fifth embodiment, a more user-friendly apparatus can be obtained by detecting the change in the direction of the image sensing head 50 and then changing the operating mode of the image sensing cartridge 49 and portable information device 8 depending upon the change in direction detected.

One such embodiment will now be described. In FIG. 36C, it is possible to sense the image of the subject in the (C) direction. However, unless the direction in which the portable information device 8 is held is changed, the image formed will be inverted (turned upside-down) in comparison with the image in the (A) direction of FIG. 36A. Accordingly, the following operation is performed once the head 50 has been changed from the state in FIG. 36B to the state in FIG. 36C:

(1) A sensed-image signal is read out so as to turn the sensed-image frame upside-down with respect to the case shown in FIG. 36A. (2) Or, the output of the image sensing element is read in a memory and then outputted upon being turned upside-down with respect to the case shown in FIG. 36A. (3) Or, if the apparatus is to be used as a TV telephone and is employed in the state shown in FIG. 36C, the output of the image sensing element is turned upside-down and then transmitted at the time of communication, whereby the image displayed on the portable information device 8 will appear in the correct attitude.

In the tenth embodiment, the image sensing head 50 is turned up and down. However, a modification of the kind shown in FIGS. 37A to 37C may be adopted, in which the head may be turned to the left and right. FIGS. 37A to 37C are diagrams illustrating the external shape of the image sensing cartridge according to this modification. The upper row shows the insertion portion of the image sensing cartridge when faced down and seen from above, and the lower row shows the same when seen from the side.

In FIGS. 37A to 37C, numeral 53 denotes a fixed portion, 54 an image sensing head, 55 a rotating portion and 56 an insertion portion. In this modification, the head is turned in such a manner that the image sensing direction is always maintained at right angles with respect to the direction of the long side of the insertion portion 56 so as to image the subject in direction (A) of FIG. 37A, the subject in the direction (B) of FIG. 37B and the subject in the direction (C) of FIG. 37C. Accordingly, if the image sensing direction in FIG. 37A is assumed to be opposite the direction of the display portion 17 of the portable information device 8, the image sensing direction will point in the same direction as the display portion 17 in FIG. 37C. In this case, therefore, it will suffice to change the control program to, say, the TV telephone mode, in the manner described above. Further, by adopting this rotational direction, it will be unnecessary to turn the image upside-down in the cases of FIGS. 37A and 37C. This will simplify the control software.

In the embodiment described above, an arrangement may be adopted in which a clicking sensation is produced when the image sensing head 50 (54) is set at a fixed angle of rotation. Alternatively, an arrangement may be adopted wherein the direction in which the image sensing cartridge 49 is currently pointing is detected and displayed on the display portion 17 of the portable information device 8. This will greatly enhance the operability of the device.

(11th Embodiment)

Figure 38:
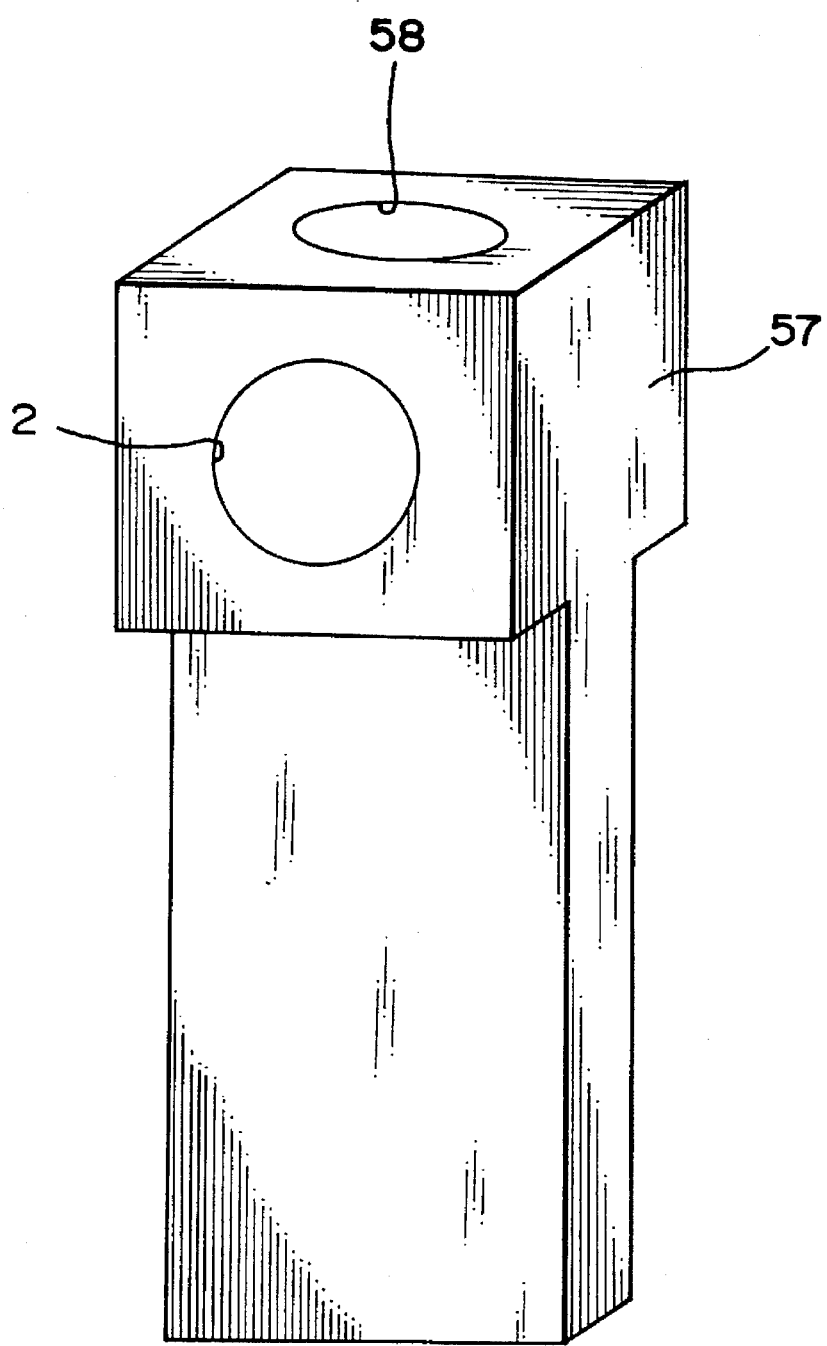
FIG. 38 is a perspective view showing an image sensing cartridge according to an 11th embodiment of the invention.
Figure 39:
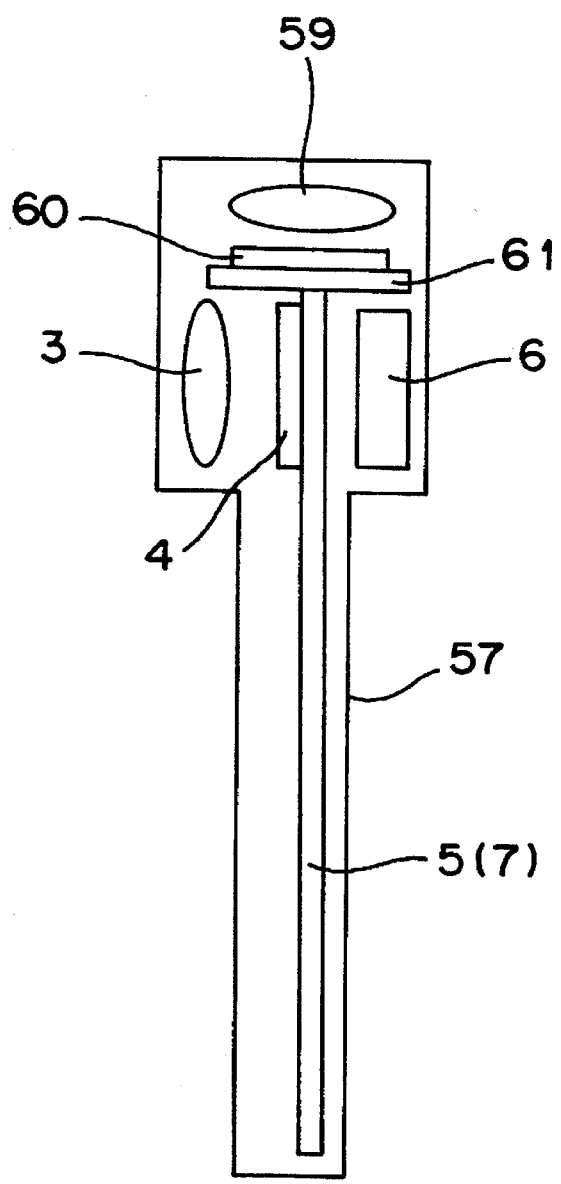
FIG. 39 is a view showing the internal construction of an image sensing cartridge according to the 11th embodiment.

FIGS. 38 and 39 are diagrams for describing the 11th embodiment of the invention, in which FIG. 38 is a perspective view of an image sensing cartridge and FIG. 39 is a view showing the internal construction of the same.

According to this embodiment, as opposed to the sixth embodiment, the opening 2 and an opening 58 for introducing light from a subject are formed in the side and top surfaces, respectively, of an image sensing cartridge 57, the optical system 3 and image sensing element 4 are provided along one direction corresponding to the opening 3, and an optical system 59 and image sensing element 60 are provided along one direction corresponding to the opening 58. Numeral 61 denotes a substrate on which a clock IC and a drive IC for driving the image sensing element 60 are mounted.

In accordance with this embodiment, the image sensing system in either of two directions may be selected as needed so that the set direction in which imaging is possible can be changed. Depending upon the case, images in two directions may be sensed and displayed simultaneously.

Thus, in accordance with the foregoing embodiments as described above, an image sensing apparatus comprising a portable, compact information device and an image sensing cartridge docked with the device is so adapted that the image sensing cartridge is capable of using an optical system having a large aperture and an image sensing system such as an image sensing element. As a result, a multiple focal-point lens or a zoom lens can be used to full capability. In addition, it is possible to realize an image sensing cartridge without using a special ultra-small image sensing element, there is no increase in the pixel density of the image sensing element and no attendant decline in sensitivity.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:

an information device having an insertion port at its upper surface; and an image sensing cartridge, which has at least an image sensing system, capable of being loaded in and unloaded from the information device by being inserted in the insertion port, wherein an image sensing operation becomes possible by docking said information device and said image sensing cartridge;

said image sensing cartridge having an opening at its side surface, which is for introducing light to the image sensing system, the diameter of which is designed to be larger than the shortest side of said upper surface.

2. The apparatus according to claim 1, wherein at least a portion of said image sensing cartridge is inserted in said information device and said portion has a card-shaped configuration.

3. The apparatus according to claim 1, wherein said image sensing cartridge is inserted in said information device and a light-transmitting opening is provided in said information device in such a manner that the opening of said image sensing cartridge is exposed.

4. The apparatus according to claim 1, wherein a portion of said image sensing cartridge is inserted in said information device and a portion of said image sensing cartridge projects from said information device so as to expose the opening of said image sensing cartridge.

5. The apparatus according to claim 1, wherein a plurality of image sensing systems having different optical-axis directions are provided inside said image sensing cartridge.

6. The apparatus according to claim 3, wherein parts that produce a large amount of heat within said image sensing cartridge are placed in the vicinity of the opening of said image sensing cartridge and the opening of said information device is enlarged until it reaches the vicinity of a location at which said parts are placed.

7. The apparatus according to claim 3, wherein a second optical system separate from said image sensing cartridge is attached to a first optical system possessed by said image sensing cartridge.

8. The apparatus according to claim 4, wherein a pin-array converting adapter is attached to said image sensing cartridge for converting a pin array of a connector of said image sensing cartridge into an exactly opposite array, whereby a method of mounting said image sensing cartridge is capable of being changed selectively.

9. The apparatus according to claim 4, wherein the portion of said image sensing cartridge projecting from said information device is thicker than the portion of said image sensing cartridge inserted into said information device.

10. The apparatus according to claim 4, wherein the portion of said image sensing cartridge projecting from said information device is made movable, thereby making it possible to change the optical-axis direction of said image sensing system selectively.

11. An image sensing apparatus comprising:

an information device having an insertion port at its upper surface; and an image sensing cartridge, which has at least an image sensing system, capable of being loaded in and unloaded from the information device by being inserted in the insertion port, wherein an image sensing operation becomes possible by docking said information device and said image sensing cartridge;

said image sensing cartridge having an opening at its side surface, which is for introducing light to the image sensing system, the opening being designed to be parallel to a direction with which the image sensing cartridge is inserted in the information device.

12. The apparatus according to claim 11, wherein at least a portion of said image sensing cartridge is inserted in said information device and said portion has a card-shaped configuration.

13. The apparatus according to claim 11, wherein said image sensing cartridge is inserted in said information device and a light-transmitting opening is provided in said information device in such a manner that the opening of said image sensing cartridge is exposed.

14. The apparatus according to claim 11, wherein a portion of said image sensing cartridge is inserted in said information device so as to expose the opening of said image sensing cartridge.

15. An image sensing apparatus comprising:

an information device having an insertion port at its upper surface; and an image sensing cartridge, which has at least an image sensing system, capable of being loaded in and unloaded form the information device by being inserted in the insertion port, wherein an image sensing operation becomes possible by docking said information device and said image sensing cartridge;

said image sensing cartridge having an opening at its side surface, which is for introducing light to the image sensing system, the opening being arranged at the largest side surface of said image sensing cartridge.

16. The apparatus according to claim 15, wherein at least a portion of said image sensing cartridge is inserted in said information device and said portion has a card-shaped configuration.

17. The apparatus according to claim 15, wherein said image sensing cartridge is inserted in said information device and a light-transmitting opening is provided in said information device in such a manner that the opening of said image sensing cartridge is exposed.

18. The apparatus according to claim 15, wherein a portion of said image sensing cartridge is inserted in said information device so as to expose the opening of said image sensing cartridge.

19. An image sensing apparatus comprising:

an information device having an insertion port at its upper surface; and an image sensing cartridge, which has at least an image sensing system, capable of being loaded in and unloaded from the information device by being inserted in the insertion port, wherein an image sensing operation becomes possible by docking said information device and said image sensing cartridge;

said image sensing cartridge having an opening at its side surface, which is for introducing light to the image sensing system, the diameter of which is designed to be larger than the shortest side of said upper surface, wherein a portion of said image sensing cartridge is inserted in said information device and a portion of said image sensing cartridge projects from said information device so as to expose the opening of said image sensing cartridge.

20. The apparatus according to claim 19, wherein at least a portion of said image sensing cartridge is inserted in said information device and said portion has a card-shaped configuration.

21. The apparatus according to claim 19, wherein said image sensing cartridge is inserted in said information device and a light-transmitting opening is provided in said information device in such a manner that the opening of said image sensing cartridge is exposed.

22. An image sensing apparatus comprising:

an information device having an insertion port at a predetermined surface; and an image sensing cartridge, which has at least an image sensing system, capable of being loaded in and unloaded from the information device by being inserted in the insertion port, wherein an image sensing operation becomes possible by connecting said information device with said image sensing cartridge;

said image sensing cartridge having an image sensing opening for introducing light to an image sensing means, the diameter of which is larger than the shortest side of said predetermined surface.

23. The apparatus according to claim 22, wherein at least a portion of said image sensing cartridge is inserted in said information device and said portion has a card-shaped configuration.

24. The apparatus according to claim 22, wherein said image sensing cartridge is inserted in said information device and a light-transmitting opening is provided in said information device in such a manner that the image sensing opening of said image sensing cartridge is exposed.

25. The apparatus according to claim 22, wherein a portion of said image sensing cartridge is inserted in said information device and a portion of said image sensing cartridge projects from said information device so as to expose the image sensing opening of said image sensing cartridge.

26. The apparatus according to claim 22, wherein a plurality of image sensing systems having different optical-axis directions are provided inside said image sensing cartridge.

27. The apparatus according to claim 24, wherein parts that produce a large amount of heat within said image sensing cartridge are placed in a vicinity of the image sensing opening of said image sensing cartridge and the image sensing opening of said information device is enlarged until it reaches the vicinity at which said parts are placed.

28. The apparatus according to claim 24, wherein a second optical system separate from said image sensing cartridge is attached to a first optical system possessed by said image sensing cartridge.

29. The apparatus according to claim 25, wherein a pin-array converting adapter is attached to said image sensing cartridge for converting a pin array of a connector of said image sensing cartridge into an exactly opposite array, whereby a method of mounting said image sensing cartridge is capable of being changed selectively.

30. The apparatus according to claim 25, wherein the portion of said image sensing cartridge projecting from said information device is thicker than the portion of said image sensing cartridge inserted into said information device.

31. The apparatus according to claim 25, wherein the portion of said image sensing cartridge projecting from said information device is made movable, thereby making it possible to change the optical-axis direction of said image sensing system selectively.

32. An image sensing apparatus comprising:

an information device having an insertion port at a predetermined surface; and an image sensing cartridge, which has at least an image sensing system, capable of being loaded in and unloaded from the information device by being inserted in the insertion port, wherein an image sensing operation becomes possible by connecting said information device with said image sensing cartridge, said image sensing cartridge having an image sensing opening for introducing light to an image sensing means, the image sensing opening being parallel to a direction with which the image sensing cartridge is inserted in the information device.

33. The apparatus according to claim 32, wherein at least a portion of said image sensing cartridge is inserted in said information device and said portion has a card-shaped configuration.

34. The apparatus according to claim 32, wherein said image sensing cartridge is inserted in said information device and a light-transmitting opening is provided in said information device in such a manner that the image sensing opening of said image sensing cartridge is exposed.

35. The apparatus according to claim 32, wherein a portion of said image sensing cartridge is inserted in said information device so as to expose the image sensing opening of said image sensing cartridge.

36. An image sensing apparatus comprising:

an information device having an insertion port at a predetermined surface; and an image sensing cartridge, which has at least an image sensing system, capable of being loaded in and unloaded from the information device by being inserted in the insertion port, wherein an image sensing operation becomes possible by connecting said information device with said image sensing cartridge, said image sensing cartridge having an image sensing opening for introducing light to the image sensing system, the image sensing opening being arranged at the largest surface of said image sensing cartridge.

37. The apparatus according to claim 36, wherein at least a portion of said image sensing cartridge is inserted in said information device and said portion has a card-shaped configuration.

38. The apparatus according to claim 36, wherein said image sensing cartridge is inserted in said information device and a light-transmitting opening is provided in said information device in such a manner that the image sensing opening of said image sensing cartridge is exposed.

39. The apparatus according to claim 36, wherein a portion of said image sensing cartridge is inserted in said information device so as to expose the image sensing opening of said image sensing cartridge.

40. An image sensing apparatus comprising:

an information device having an insertion port at a predetermined surface; and an image sensing cartridge, which has at least an image sensing system, capable of being loaded in and unloaded from the information device by being inserted in the insertion port, wherein an image sensing operation becomes possible by connecting said information device with said image sensing cartridge;

said image sensing cartridge having an image sensing opening for introducing light to an image sensing system, the diameter of which is larger than the shortest side of said predetermined surface, wherein a portion of said image sensing cartridge is inserted in said information device and a portion of said image sensing cartridge projects from said information device so as to expose the image sensing opening of said image sensing cartridge.

41. The apparatus according to claim 40, wherein at least a portion of said image sensing cartridge is inserted in said information device and said portion has a card-shaped configuration.

42. The apparatus according to claim 40, wherein said image sensing cartridge is inserted in said information device and a light-transmitting opening is provided in said information device in such a manner that the image sensing opening of said image sensing cartridge is exposed.

43. An image sensing apparatus comprising:

an information device having a connection port at a predetermined surface; and an image sensing cartridge, which has at least an image sensing system, capable of being attached to and detached from the information device by being connected with the connection port, wherein an image sensing operation becomes possible by connecting said information device with said image sensing cartridge, said image sensing cartridge being connected to an image sensing opening for introducing light to an image sensing means, the minimum length of the image sensing opening is larger than the shortest side of said predetermined surface.

44. The apparatus according to claim 43, wherein at least a portion of said image sensing cartridge is connected with said information device and said portion has a card-shaped configuration.

45. The apparatus according to claim 43, wherein a portion of said image sensing cartridge is connected with said information device and a portion of said image sensing cartridge projects from said information device so as to expose the image sensing opening of said image sensing cartridge.

46. An image sensing apparatus comprising:

an image sensing cartridge, which has at least an image sensing system, capable of being attached to and detached from an information device having a connection port at a predetermined surface by being connected with the connection port, wherein an image sensing operation becomes possible by connecting said image sensing cartridge with said information device;

said image sensing cartridge being connected to an image sensing opening for introducing light to an image sensing means, the minimum length of the image sensing opening is larger that he shortest side of said predetermined surface.

47. The apparatus according to claim 46, wherein at least a portion of said image sensing cartridge is connected with said information device and said portion has a card shaped configuration.

48. The apparatus according to claim 46, wherein a portion of said image sensing cartridge is connected with said information device and a portion of said image sensing cartridge projects from said information device so as to expose the image sensing opening of said image sensing cartridge.

49. An image sensing apparatus comprising:

an image sensing cartridge, which has at least an image sensing system, capable of being attached to and detached from an information device having a connection port at a predetermined surface by being connected with the connection port, wherein an image sensing operation becomes possible by connecting said image sensing cartridge with said information device:

said image sensing cartridge having an image sensing opening for introducing light to an image sensing means, the minimum length of the image sensing opening is larger than the shortest side of said predetermined surface.

50. The apparatus according to claim 49, wherein at least a portion of said image sensing cartridge is connected with said information device and said portion has a card-shaped configuration.

51. The apparatus according to claim 49, wherein a portion of said image sensing cartridge is connected with said information device and a portion of said image sensing cartridge projects from said information device so as to expose the image sensing opening of said image sensing cartridge.

52. An image sensing apparatus comprising:

a card unit capable of being attached to and detached from another apparatus;

a image sensing part connected with said card unit, said card unit having means for controlling at least an image sensing operation; and an opening for obtaining an image on said image sensing part, the minimum length of which is larger than a shortest side of said card unit.

53. An image sensing apparatus comprising:

A card unit capable of being connected with another apparatus;

an image sensing part, an image sensing direction of which is changeable with regard to said card unit, said card unit having means for controlling at least an image sensing operation; and an opening for obtaining an image on said image sensing part, the minimum length of which is larger than a shortest side of said card unit.

54. An image sensing apparatus comprising:

a card unit capable of being inserted into another apparatus through an insertion port, said card unit having a substantial rectangular parallelepiped configuration and being inserted lengthway into said another apparatus;

an image sensing part connected with said card unit, having at least an optical unit having an opening for taking an image, wherein the minimum length of the opening is larger than a shortest side of said card unit, and said card unit having a CPU for controlling at least an image sensing operation.

* * * * *